US011239715B2

(12) United States Patent
    Morishita

(10) Patent No.: US 11,239,715 B2
(45) Date of Patent: Feb. 1, 2022

(54) ELECTROMAGNETIC DEVICE

(71) Applicant: Kogakuin University, Tokyo (JP)

(72) Inventor: Mimpei Morishita, Tokyo (JP)

(73) Assignee: Kogakuin University, Tokyo (JP)

( * ) Notice: Subject to any disclaimer, the term of this patent is extended or adjusted under 35 U.S.C. 154(b) by 152 days.

(21) Appl. No.: 16/642,844

(22) PCT Filed: Aug. 30, 2018

(86) PCT No.: PCT/JP2018/032261
    § 371 (c)(1),
    (2) Date: Feb. 27, 2020

(87) PCT Pub. No.: WO2019/045017
    PCT Pub. Date: Mar. 7, 2019

(65) Prior Publication Data
    US 2020/0244119 A1    Jul. 30, 2020

(30) Foreign Application Priority Data

Aug. 30, 2017  (JP) .............................. JP2017-165468
Nov. 14, 2017  (JP) .............................. JP2017-219530

(51) Int. Cl.
    *H02K 1/27*      (2006.01)
    *H02K 3/47*      (2006.01)
    *H02K 21/14*     (2006.01)
(52) U.S. Cl.
    CPC ............... *H02K 1/278* (2013.01); *H02K 3/47* (2013.01); *H02K 21/14* (2013.01)

(58) Field of Classification Search
    CPC .......... H02K 1/278; H02K 3/47; H02K 21/14; H02K 1/2786; H02K 16/02;
    (Continued)

(56) References Cited

U.S. PATENT DOCUMENTS 10,326,322 B2 *  6/2019  Gandhi ................. H02K 1/246
2012/0255843 A1  10/2012  Brooks
2012/0299398 A1  11/2012  Morimoto

FOREIGN PATENT DOCUMENTS

CN      1761130 A      4/2006
CN      202759306 U    2/2013
(Continued)

OTHER PUBLICATIONS

International Search Report in PCT/JP2018/032261, dated Nov. 27, 2018, 1 page.
Office Action in CN2018800564922, dated Apr. 6, 2021, 11 pages.

*Primary Examiner* — Thomas Truong
(74) *Attorney, Agent, or Firm* — Kilpatrick Townsend & Stockton LLP

(57) ABSTRACT

In an electric motor, three-phase coils are provided to an armature disposed between an outside field system and an inside field system, and Halbach arrays are employed in the outside field system and the inside field system. Each of the Halbach arrays is divided by a number of divisions that is any number computed by adding two to a multiple of three. Permanent magnets are arrayed such that their magnetization directions are changed in sequence by steps of an angle computed by dividing one cycle's worth of electric angle by the number of divisions. Torque ripple is thereby suppressed in the electric motor.

7 Claims, 19 Drawing Sheets

(58) Field of Classification Search
CPC ............. H02K 2213/03; H02K 41/031; H02K 1/27–1/2793; H02K 3/00–3/528; H02K 41/00–41/065

See application file for complete search history.

(56) References Cited

FOREIGN PATENT DOCUMENTS

| | | |
|---|---|---|
| JP | 2004-015906 A | 1/2004 |
| JP | 2007-014110 A | 1/2007 |
| JP | 2009-201343 A | 3/2009 |
| JP | 2010-154688 A | 7/2010 |
| JP | 2014-516236 A | 7/2014 |
| JP | 2015-27208 A | 2/2015 |
| WO | 2006/127628 A1 | 11/2006 |

* cited by examiner

EXAMPLE 1

EXAMPLE 2

COMPARATIVE EXAMPLE 1

COMPARATIVE EXAMPLE 2

COMPARATIVE EXAMPLE 3

COMPARATIVE EXAMPLE 4

ELECTROMAGNETIC DEVICE

TECHNICAL FIELD

The present invention relates to an electromagnetic device such as a rotary electrical machine or the like.

BACKGROUND ART

There are electromagnetic devices, such as linear motors, rotary electrical machines like a rotary electric motor or generator etc., and the like, in which a field system resulting from alternately arraying N poles and S poles of permanent magnets (a N-S array field system) is employed. In a N-S field system, a magnetic field is produced at both sides of the arrayed magnets, such that the magnetic field generated by the permanent magnets is not able to be used effectively.

In order to address this issue, a Halbach array is sometimes employed as a method to array permanent magnets so as to raise the magnetic field produced by the field system. A Halbach array is a method to array magnets in which permanent magnets are arrayed while rotating the magnetic poles (magnetization direction) of the permanent magnets by steps of 90°. This enables a strong magnetic field to be produced in an example of a magnet array.

Japanese Patent Application Laid-Open (JP-A) Nos. 2009-201343 and 2010-154688 also propose arranging a pair of Halbach arrays such that their magnetic fields mutually reinforce each other, so as to thereby provided field systems (dual Halbach array field systems) capable of effectively utilizing the magnetic fields generated by permanent magnets.

However, torque ripple produced in rotors cause vibration and noise to be generated in electric motors. Moreover, in a drive device employing an electric motor as the drive source, torque ripple effects the rest position and operational precision of moving members moved by the electric motor. There is accordingly a desire to suppress torque ripple in rotary electrical machines (electric motors) and the like.

In a rotary electrical machine of JP-A No. 2007-014110, a rotor core is supported by a stator including windings, and a rotor is provided that has main magnets and auxiliary magnets alternately arranged at the periphery of a rotor core along the circumferential direction of the rotor core. The main magnets of the rotor are magnetized along the radial direction of the rotor core, and the auxiliary magnets are magnetized in a direction other than the radial direction (at 90° to the radial direction). In an attempt to suppress torque ripple, this rotary electrical machine is configured such that either: the expression $0<Ws<1.5t$ is satisfied, wherein Ws is a circumferential direction width of a stator-side face of the auxiliary magnets and t is a radial direction thickness of the auxiliary magnets; or the expression $0<\theta s/\theta p<1.9t<r$ is satisfied, wherein $\theta s/\theta p$ is the value of a ratio of an angle $\theta s$ formed by the two circumferential direction end faces of the auxiliary magnets with respect to a magnetic pole pitch $\theta p$, and $t/r$ is the value of a ratio of the radial direction thickness t of the auxiliary magnets with respect to the radius r of the rotor.

However, in a Halbach array field system in which the magnetization directions of permanent magnets are rotated by steps of 90°, the amplitude of the $5^{th}$ order harmonic component of the flux density distribution in the vicinity of the field system surface is large. Thus in the Halbach array field system as described above, torque ripple is generated by the interaction between the harmonic components included in the flux density distribution and alternating current passing through the coils of the armature.

In an electric motor employing a dual Halbach array field system, although a high output torque is obtained with high efficiency in a state in which there are extremely small harmonic components at low rotation speeds, there is a large back electromotive force at high rotation speeds. Power sources to drive electric motors employing dual Halbach array field systems accordingly need an output voltage that exceeds the back electromotive force generated at high rotation speeds.

Moreover, in an electric motor employing a dual Halbach array field system, ordinarily a dual Halbach array field system is employed on a rotor side, and armature coils are employed on the stator side. This accordingly results in a double cylinder structure for the rotor of the electric motor, in which an outer rotor is integrated together with an inner rotor. Moreover, in order to dispose the armature coils between the outer rotor and the inner rotor, a bulky, cater-levered structure is adopted for the rotor. Thus in an electric motor employing a dual Halbach array field system, the structure of the rotor is complicated, and there is a concern regarding vibration and noise generated at high rotation speeds.

Moreover, in an electric motor employing a dual Halbach array field system, the armature coils are disposed inside the rotor of double cylinder structure, resulting in heat not being readily dissipated, and in problems due to the heat generated by the armature coil etc.

SUMMARY OF INVENTION

Technical Problem

An object of an exemplary embodiment of the present invention is to suppress torque ripple in an electromagnetic device. An object of an exemplary embodiment of the present invention is to eliminate problems of heat dissipation while obtaining stable output in an electromagnetic device.

Solution to Problem

An electromagnetic device of the present invention includes the following aspects.

An electromagnetic device of a first aspect includes an armature provided with three-phase coils and a field system. The field system includes plural permanent magnets arrayed in a prescribed direction such that their magnetization directions are changed in sequence by steps of an angle computed by dividing one cycle's worth of electric angle of current in the coils by a number of divisions. The number of divisions being any number computed by adding two to a multiple of three. One out of the armature or the field system moves relative to the other out of the armature or the field system in the permanent magnet array direction.

An electromagnetic device of a second aspect is the electromagnetic device of the first aspect, wherein the coils are air-core coils.

An electromagnetic device of a third aspect is the electromagnetic device of the first aspect or the second aspect wherein the field system is configured by a pair of the permanent magnet arrays facing each other across a prescribed gap, with the armature disposed in the gap.

An electromagnetic device of a fourth aspect is the electromagnetic device of the third aspect wherein in the field system an outside field system and an inside field system each having a cylindrical shape are formed from the pair of permanent magnet arrays, and in the gap between the inside field system and the outside field system, a ratio of a spatial volume of the gap outside a central line to a spatial volume of the gap inside the central line is similar to a ratio of a volume of the outside field system to a volume of the inside field system.

An electromagnetic device of a fifth aspect is the electromagnetic device of the first aspect or the second aspect wherein the electromagnetic device further includes a stator formed in a cylindrical shape from a magnetic material, with the rotor disposed so as to be capable of relative rotation inside the cylindrical shape. In the fifth aspect the armature is configured by respectively providing the three-phase coils along a circumferential direction on an inner peripheral face of the stator.

An electromagnetic device of a sixth aspect is the electromagnetic device of the fifth aspect wherein a gap length G between an outer peripheral face of the field system and an inner peripheral face of the stator is smaller than a pole pitch τ of the field system.

An electromagnetic device of a seventh aspect is the electromagnetic device of the fifth aspect or the sixth aspect, wherein in a fan shaped cross-section of the permanent magnets forming the field system, a mean value of a radial direction outside circular arc length and a radial direction inside circular arc length is smaller than a difference between a radial direction outside circular arc radius and a radial direction inside circular arc radius.

An electromagnetic device of an eighth aspect is the electromagnetic device of any one of the first aspect to the seventh aspect wherein the windings of the coils are made from Litz wire.

These aspects of the present invention exhibit the advantageous effect of enabling torque ripple to be suppressed in an electric motor or the like.

Moreover, in these aspects of the present invention, the coils are air-core coils, and so cogging torque can be suppressed.

Furthermore, these aspects of the present invention employ magnetic material in the stator where the coils are disposed, and accordingly exhibit the advantageous effect of enabling the coils to be cooled from the outer peripheral side, facilitating heat dissipation.

Moreover, in these aspects of the present invention, the gap length G between an outer peripheral face of the field system and an inner peripheral face of the stator is smaller than the pole pitch τ of the field system, which enables back electromotive force to be suppressed and enables torque to be output up to high rotation speed.

These aspects of the present invention employ Litz wire in the coils, thereby enabling an increase in eddy current loss to be suppressed, and enabling heat generation in the coils to be suppressed.

DESCRIPTION OF EMBODIMENTS

Detailed explanation follows regarding exemplary embodiments of the present invention, with reference to the drawings.

First Exemplary Embodiment

Figure 1:
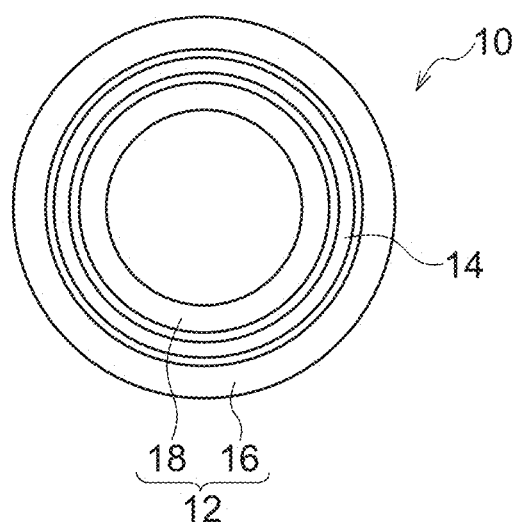
FIG. 1 illustrates main parts of an electric motor according to the first exemplary embodiment, in a plan view as seen along an axial direction thereof.

FIG. 1 illustrates main parts of a three-phase AC motor (hereafter referred to as electric motor 10) serving as an electromagnetic device according to a first exemplary embodiment, illustrated in plan view along an axial direction. The electric motor 10 is equipped with a field system 12 and an armature 14. The field system 12 and the armature 14 are housed in a non-illustrated casing (case).

The field system 12 is formed by an outside field system unit 16 and an inside field system unit 18, which both have a substantially cylindrical shape. The outside field system unit 16 configures an outside field system and the inside field system unit 18 configures an inside field system. The inner diameter of the outside field system unit 16 is larger than the outer diameter of the inside field system unit 18. The outside field system unit 16 and the inside field system unit 18 are coaxially disposed in the field system 12, with the inside field system unit 18 housed inside the outside field system unit 16 and integrated thereto. The armature 14 is also formed in a substantially cylindrical shape, with the inner diameter of the armature 14 larger than the outer diameter of the inside field system unit 18, and the outer diameter of the armature 14 smaller than the inner diameter of the outside field system unit 16.

In the electric motor 10, the armature 14 is coaxial to the field system 12 (the outside field system unit 16 and the inside field system unit 18) and is housed the between the outside field system unit 16 and the inside field system unit 18. In the electric motor 10, the field system 12 is supported by the casing so as to be rotatable relative to the armature 14.

Figure 2:
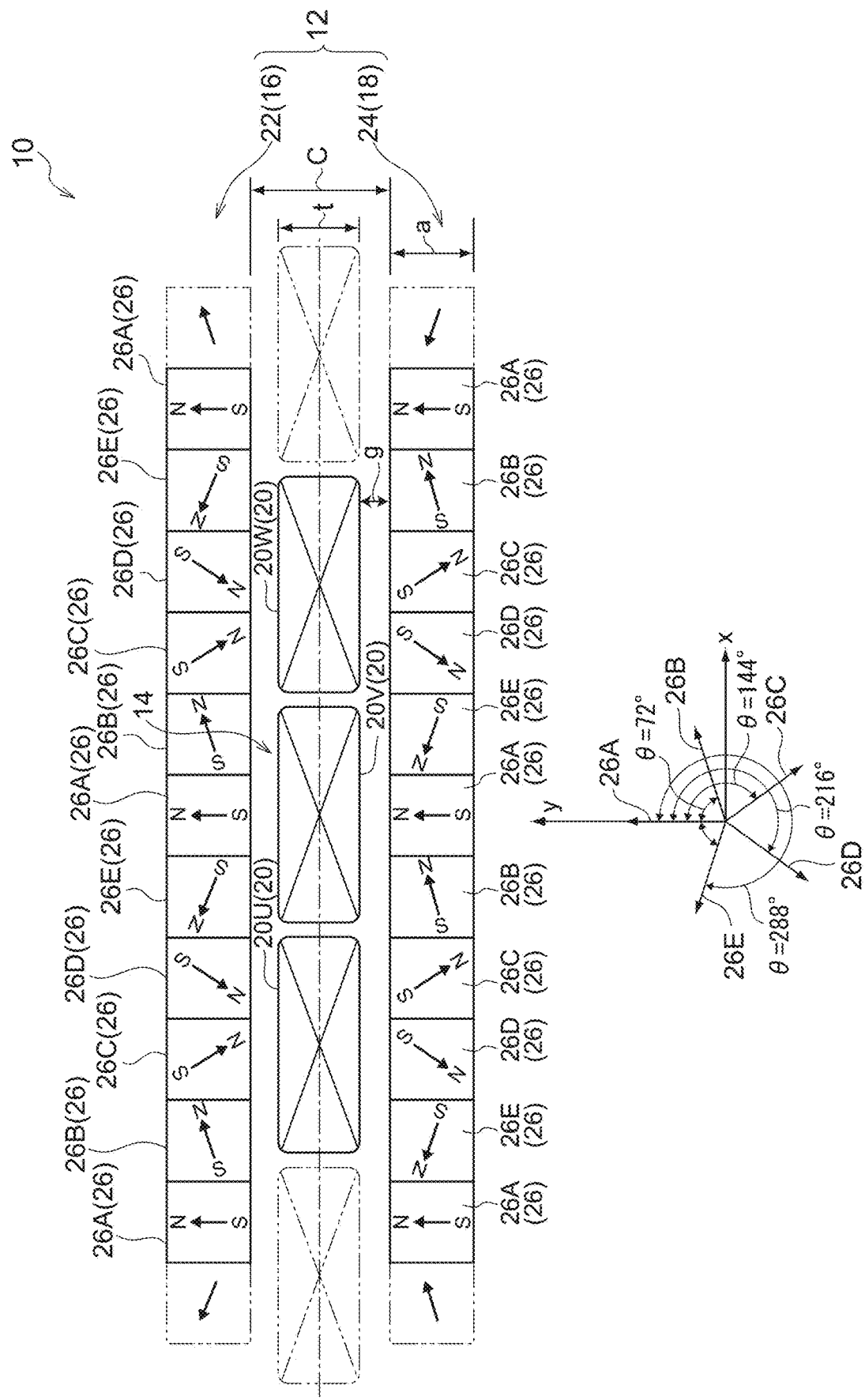
FIG. 2 is an opened-out view to illustrate a field system and an armature.
Figure 3:
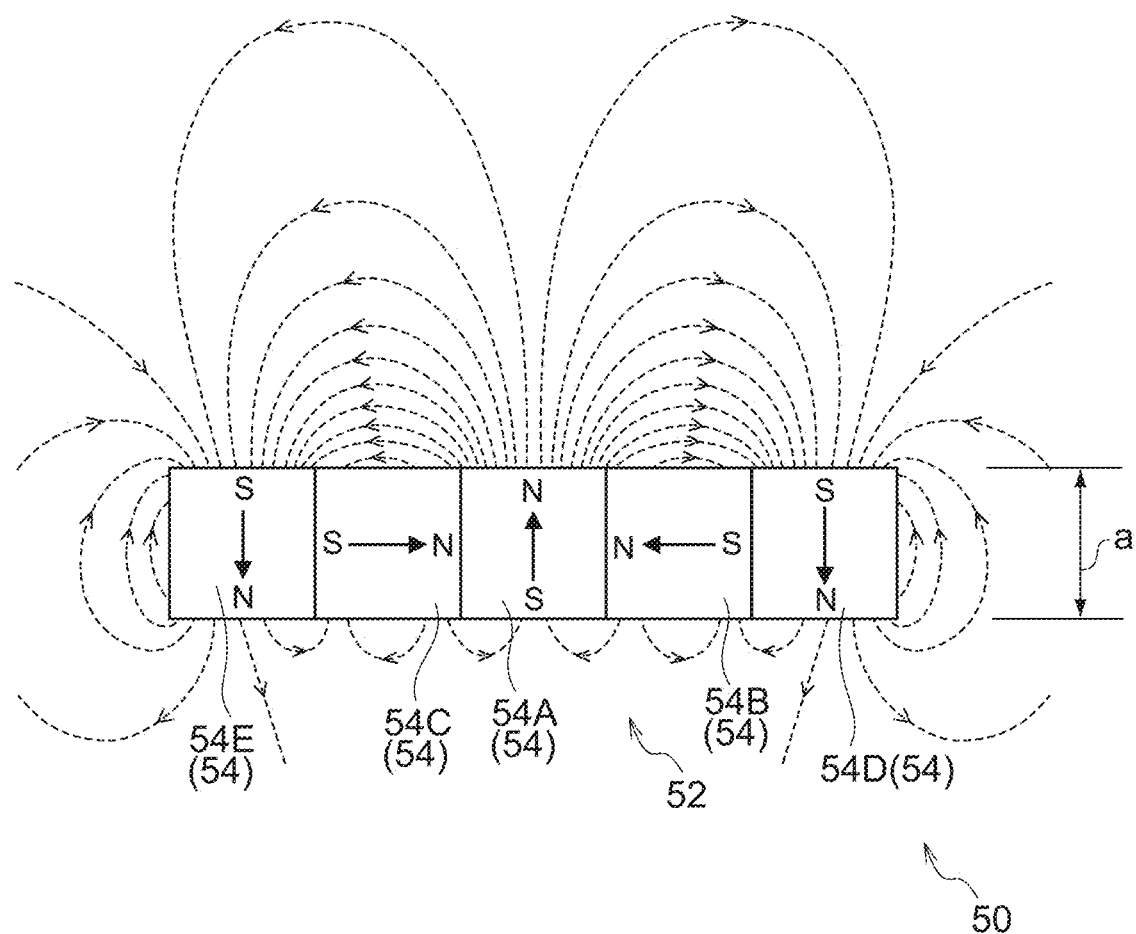
FIG. 3 is an opened-out view to illustrate main parts of an ordinary Halbach array field system.

FIG. 2 is an opened-out view illustrating a radial direction cross-section of main parts of the electric motor 10, as view along the axial direction. FIG. 3 is an opened-out view to illustrate main parts of an ordinary Halbach array field system 50. Note that N is appended to north poles and S is appended to south poles in the drawings, magnetization directions are indicated with arrows, and lines of magnetic force are indicated with broken lines. Moreover, the direction of electric angle in the Halbach array is indicated by the arrow x in the drawings, and the direction of lines of magnetic force that contribute to torque generation in the electric motor 10 are indicated by the arrow y in the drawings. In the electric motor 10 the arrow y corresponds to the radially outward direction of the field system 12 and the armature 14, and the arrow x corresponds to one circumferential direction side in the field system 12 and the armature 14.

As illustrated in FIG. 2, plural coils 20 are installed in the armature 14. The coils 20 may be coils with a core, but are preferably air-core coils, and each of the coils 20 in the first exemplary embodiment is an air-core coil. The coils 20 are configured in sets of a U-phase coil 20U, a V-phase coil 20V, and a W-phase coils 20W, with plural sets of the coils 20 arrayed around the circumferential direction of the armature 14. A three-phase alternating current flows in the coils 20 according to a three-phase AC power supplied to the electric motor 10 at a prescribed voltage. When this occurs, an alternating current flows in the coils 20U, 20V, 20W, with phases shifted by steps of 120° over the range of one cycle's worth of electric angle. Note that the coils 20 (20U, 20V, 20W) may be configured into coil groups through which current of the same phase flows.

In the field system 12, the outside field system unit 16 and the inside field system unit 18 form a magnetic field between the outside field system unit 16 and the inside field system unit 18. In the electric motor 10, a three-phase alternating current flows in the coils 20, and the field system 12 and the armature 14 are moved relative to each other thereby.

The field system 12 is configured by a dual Halbach array field system employing a Halbach array in each of the outside field system unit 16 and the inside field system unit 18. The Halbach arrays employed in the outside field system unit 16 and the inside field system unit 18 may be formed by changing the magnetization direction of plural permanent magnets by steps of a prescribed angle when arraying the plural permanent magnets configured with rectangular cross-sections. When this is performed, the permanent magnets are arrayed while sequentially changing their magnetization directions by steps of a setting angle $\Delta$, wherein the setting angle $\Delta$ is an angle (a divided angle) computed by dividing one cycle's worth of electric angle ($2\pi=360°$) by an integer of 3 or more.

If m is the number of divisions in the Halbach array, then ordinarily a configuration in which m=4 (4 divisions) is employed, and FIG. 3 illustrates the Halbach array field system 50 in which the number of divisions m=4. A Halbach array (single Halbach array) 52 is provided in the Halbach array field system 50. Plural permanent magnets (magnets) 54 are employed in the Halbach array 52, with the magnets 54 arrayed such that their magnetization directions are changed by a setting angle $\Delta$ ($\Delta=90°$) that has been set from the number of divisions m. The magnets 54 are preferably, for example, rectangular in shape (squares of side length a in cross-section parallel to the magnetization direction), and the magnets 54 are preferably arrayed so as to be in close contact with each other.

In the Halbach array 52 there is a magnet 54A having a magnetization direction facing toward one side in a direction intersecting the array direction, and magnets 54B, 54C disposed at the two array direction sides of the magnet 54A have magnetization directions facing toward the magnet 54A. Moreover, magnets 54D, 54E that are adjacent to the magnets 54B, 54C on the opposite sided thereof to the magnet 54A have magnetization directions facing in the opposite direction to the magnetization direction of the magnet 54A. Note that there is also a magnet 54 (a magnet 54 similar to the magnet 54C) having a magnetization direction facing in the opposite direction to toward the magnet 54B disposed on the opposite side of the magnet 54D to the magnet 54B, and there is also a magnet 54 (a magnet 54 similar to the magnet 54B) having a magnetization direction facing in the opposite direction to toward the magnet 54C disposed on the opposite side of the magnet 54E to the magnet 54C (both of these magnets are not illustrated in the drawings).

Thus in the Halbach array 52, the strength of any magnetic field in the direction opposite to the magnetization direction of the magnet 54A is suppressed, and a comparatively strong magnetic field is formed on the magnetization direction side of the magnet 54A compared to that on the opposite side to the magnetization direction of the magnet 54A.

In the outside field system unit 16 and the inside field system unit 18 according to the first exemplary embodiment, the number of divisions m in one cycle's worth of electric angle (wherein m is a positive integer) may be any number computed by adding two to a multiple of three ($m=3\cdot n+2$, wherein n is any positive integer). In the outside field system unit 16 and the inside field system unit 18 the setting angle Δ is set from the number of divisions m (θ=360°/m), and the magnetization direction (inclination of the magnetization direction) of each of the permanent magnets is set from the setting angle Δ.

Thus in the field system 12 the number of divisions m is set to any one m=5, 8, 11, 14, 17, 20, 23, . . . ). Moreover, the setting angle Δ is set to Δ=72° when the number of divisions m=5, the setting angle Δ is set to Δ=45° when the number of divisions m=8, and the setting angle Δ is set to Δ=32.7° when the number of divisions m=11, and so on.

FIG. 2 illustrates the field system 12 for a case in which the number of divisions m=5. In the field system 12, a Halbach array 22 is employed for the outside field system unit 16, and a Halbach array 24 is employed for the inside field system unit 18. Note that there is no need for the magnetic flux to be at a position parallel to the y axis at the start point of rotation, and any given angle to the y axis may be employed as the start point.

Plural permanent magnets (magnets) 26 are employed in the Halbach arrays 22, 24. Similarly to the magnets 54, the magnets 26 are preferably substantially rectangular in shape (substantially square in shape with side length a in cross-section), and in the Halbach arrays 22, 24 the magnets 26 are preferably arrayed so as to be in close contact with each other.

The magnetization direction of the magnets 26 is set with reference one side of a square shaped cross-section, and a magnet 26A is employed that has been magnetized along the direction of the reference side. For the magnets 26, due to the setting angle Δ=72°, a magnet 26B is employed that has been magnetized so as to have a magnetization direction at an inclination of angle θ=72° with respect to the reference side, and a magnet 26C is employed that has been magnetized so as to have a magnetization direction at an inclination of angle θ=144° (or 36° is also OK) with respect to the reference side. Moreover, the magnets 26 include a magnet 26D that has been magnetized so as to have a magnetization direction at an inclination of angle θ=216° (or −144°) with respect to the reference side, and a magnet 26E that has been magnetized so as to have a magnetization direction at an inclination of angle θ=288° (or −72° is also OK) with respect to the reference side.

In the Halbach array 24, the magnet 26A is disposed with a magnetization direction facing toward the Halbach array 22, with the magnets 26E, 26D, 26C, 26A arrayed in this sequence on one side of the magnet 26A, and with the magnets 26B, 26C, 26D, 26E arrayed in this sequence on the other side of the magnet 26A. Moreover, in the Halbach array 22, the magnet 26A is disposed with a magnetization direction facing toward the opposite side to the Halbach array 24 side, with the magnets 26E, 26D, 26C, 26B arrayed in this sequence on one side of the magnet 26A, and with the magnets 26B, 26C, 26D, 26E arrayed in this sequence on the other side of the magnet 26A. Moreover, each of the magnets 26A to 26E have similar cross-sectional shapes for cross-sections along the array direction.

In the field system 12, the magnet 26A of the Halbach array 22 (the inside field system unit 18) and the magnet 26A of the Halbach array 24 (the outside field system unit 16) face toward each other, and the Halbach arrays 22, 24 are arranged such that opposing magnetized faces have a prescribed gap length C therebetween. The gap length C is the gap between the magnetized faces of the magnets 26 of the Halbach array 22 and the magnetized faces of the magnets 26 of the Halbach array 24.

A radial direction thickness t of the armature 14 (the coils 20) between the Halbach arrays 22, 24 is a thickness that achieves a prescribed gap to the magnetized faces. Moreover, the spacing (gap g) between the coil 20 peripheral faces and the magnetized faces is a narrower spacing than one side length a of the magnets 26. In the first exemplary embodiment, the gap g is not greater than ½ length a (g≤(a/2)), and the outermost periphery of the conductor wire forming the coils 20 of the armature 14 are preferably in close proximity to the surfaces (magnetized faces) of the magnets 26.

In the electric motor 10 configured in this manner, a dual Halbach array field system is employed for the field system 12. Consider a dual Halbach array field system in which a pair of Halbach array field systems (single Halbach array field systems) are opposed across a prescribed gap, wherein a central position of the gap is a gap center (see the single-dot broken line in FIG. 2). In such a configuration, a ratio of the spatial volume from the gap center to one of the Halbach array field systems to the spatial volume from the gap center to the other of the Halbach array field systems is similar (equivalent) to the ratio of the volume of the one Halbach array field system to the volume of the other Halbach array field system.

The outside field system unit 16 and the inside field system unit 18 are formed into substantially cylindrical shapes by equal area deformation so as to deform each of the pair of Halbach array field systems without changing the area thereof. This means that between the outside field system unit 16 and the inside field system unit 18 that have each been deformed into a cylindrical shape without changing area, the ratio of the spatial volume from the gap center to the outside field system unit 16 and the spatial volume (volume) from the gap center to the inside field system unit 18, maintains a similar (substantially equivalent) relationship to the ratio between the volume of the outside field system unit 16 and the volume of the inside field system unit 18. Thus in the field system 12, between the outside field system unit 16 and the inside field system unit 18 there is a magnetic field formed that is equivalent to that of a dual Halbach array field system configured by plural permanent magnets arrayed in a straight line, and the field system 12 is configured by a dual Halbach array field system.

In the electric motor 10, due to configuring the field system 12 with a dual Halbach array field system there is a higher magnetic field in the relative movement zone of the coils 20 (the armature 14) (a zone between the outside field system unit 16 and the inside field system unit 18). Moreover, in the electric motor 10, due to the coils 20 being in close proximity to the field system surfaces of the outside field system unit 16 and the inside field system unit 18, the magnetic flux interlinking with the coils 20 is also greater. This means that the electric motor 10 obtains a larger output torque than cases in which the coils 20 are more separated from the field system surfaces (i.e. when the gap g satisfies g>(a/2)).

Moreover, in the electric motor 10, the coils 20 are configured by air-core coils, and so the inductance of the coils 20 can be made small, enabling back electromotive force produced by the coils 20 to be suppressed, and thereby enabling a higher rated rotation speed. Furthermore, due to the coils 20 in the electric motor 10 being configured by air-core coils, the generation of cogging torque can be prevented.

However, it is known that in a three-phase synchronous motor, from out of the spatial harmonic components present in the flux density per one cycle's worth of electric angle, torque ripple caused by spatial harmonic components are not generated (i.e. are suppressed) for harmonic orders that are multiples of three (i.e. $3^{rd}$ order, $6^{th}$ order, . . . ). Moreover, the amplitude of the spatial harmonic components effects torque ripple, and from out of the spatial harmonic components, the amplitude of low order spatial harmonic components is larger than the amplitude of high order spatial harmonic components, with the low order spatial harmonic components particularly effecting torque ripple.

Moreover, in a field system unit employing a Halbach array, the number of magnets to be arrayed is determined from the number of divisions m in one cycle's worth of electric angle (i.e. is the same as the number of divisions m). The harmonic components (spatial harmonic components) are present in the changes in the flux density in the magnetic field (changes in the electric angle direction). The spatial harmonic components in the Halbach array have a larger amplitude for orders in which one is added to a multiple of k times the number of divisions (number of magnet divisions) m (i.e. for orders m·k+1, wherein k is a positive integer). For example, in cases in which the number of divisions m=4, the amplitudes are larger for the $5^{th}$ order (k=1) and the $9^{th}$ order (k=2) spatial harmonic components.

Ordinarily in Halbach array field systems, a configuration is adopted in which magnetic poles of permanent magnets (magnets 26) are rotated along the array direction at each rotation angle (setting angle Δ) computed by dividing one cycle's worth of electric angle (2π) by m. In such Halbach array field systems, f(s) is a two-dimensional flux distribution in the Laplace space of a given permanent magnet, and H(s) is a magnetic field spatial distribution of the Halbach array field system, and H(jω) is a frequency representation of the magnetic field spatial distribution H(s).

In such cases, the magnetic field spatial distribution H(s) is expressed by Equation (1), and the frequency representation H(jω) of the magnetic field spatial distribution H(s) is expressed by Equation (2).

$$H(s) = f(s) + \sum_{k=1}^{m} f(s)e^{j\frac{2\pi}{m}k}e^{-\frac{2\pi}{m}ks} = \quad (1)$$

$$f(s)\left(1 + \sum_{k=1}^{m} e^{j\frac{2\pi}{m}k}e^{-\frac{2\pi}{m}ks}\right) = f(s)\frac{1}{1 - e^{\frac{2\pi}{m}(j-s)}}$$

$$H(j\omega) = f(j\omega)\frac{1}{1 - e^{\frac{2\pi}{m}j(1-\omega)}} \quad (2)$$

Wherein k is a non-negative integer (an integer of 0 or greater), and there is a singularity present when w satisfies Equation (3). The values of w that satisfy such a condition are given by Equation (4), and spatial harmonics of order (k·m+1) are present in the Halbach array field system. Herein, the fundamental wave is when m=0, and harmonics are present when m is a positive number.

$$\frac{2\pi}{m}(1 - \omega) = \pm 2k\pi \quad (3)$$

$$\omega = \mp km + 1 \quad (4)$$

Thus in the Halbach array field system, by setting the number of divisions m such that m=3·n+2 (wherein n is a positive integer), the first harmonic (k=1) can be made to be a multiple of 3. Moreover, in a three-phase synchronous motor, torque ripple caused by this harmonic component can be canceled out between the three phases of windings.

In the first exemplary embodiment, the number of divisions m=3·n+2 (wherein n is any positive integer). Thus in the electric motor 10 that employs three-phase alternating current electrical power, the generation of spatial harmonic components that effect torque ripple in the field system employing the Halbach array (Halbach array field system) can be suppressed, enabling torque ripple to also be suppressed.

FIG. 4A, FIG. 4B, and FIG. 5A to FIG. 5D illustrate the results of simulations for the first exemplary embodiment. In these simulations the distribution of magnetic flux (magnetic flux lines) in a dual Halbach array field system and the flux density thereof are found by computational electromagnetics using a finite element method. The distributions of magnetic flux lines are shown in FIG. 4A, FIG. 4B, and FIG. 5A to FIG. 5D, and the distributions of flux density (strengths of magnetic field) are illustrated after normalization. Note that the outline shape (external shape) of the magnets forming the field system (the dual Halbach array field system) are illustrated by double-dot broken lines in FIG. 4A, FIG. 4B, and FIG. 5A to FIG. 5D.

Figure 4A:
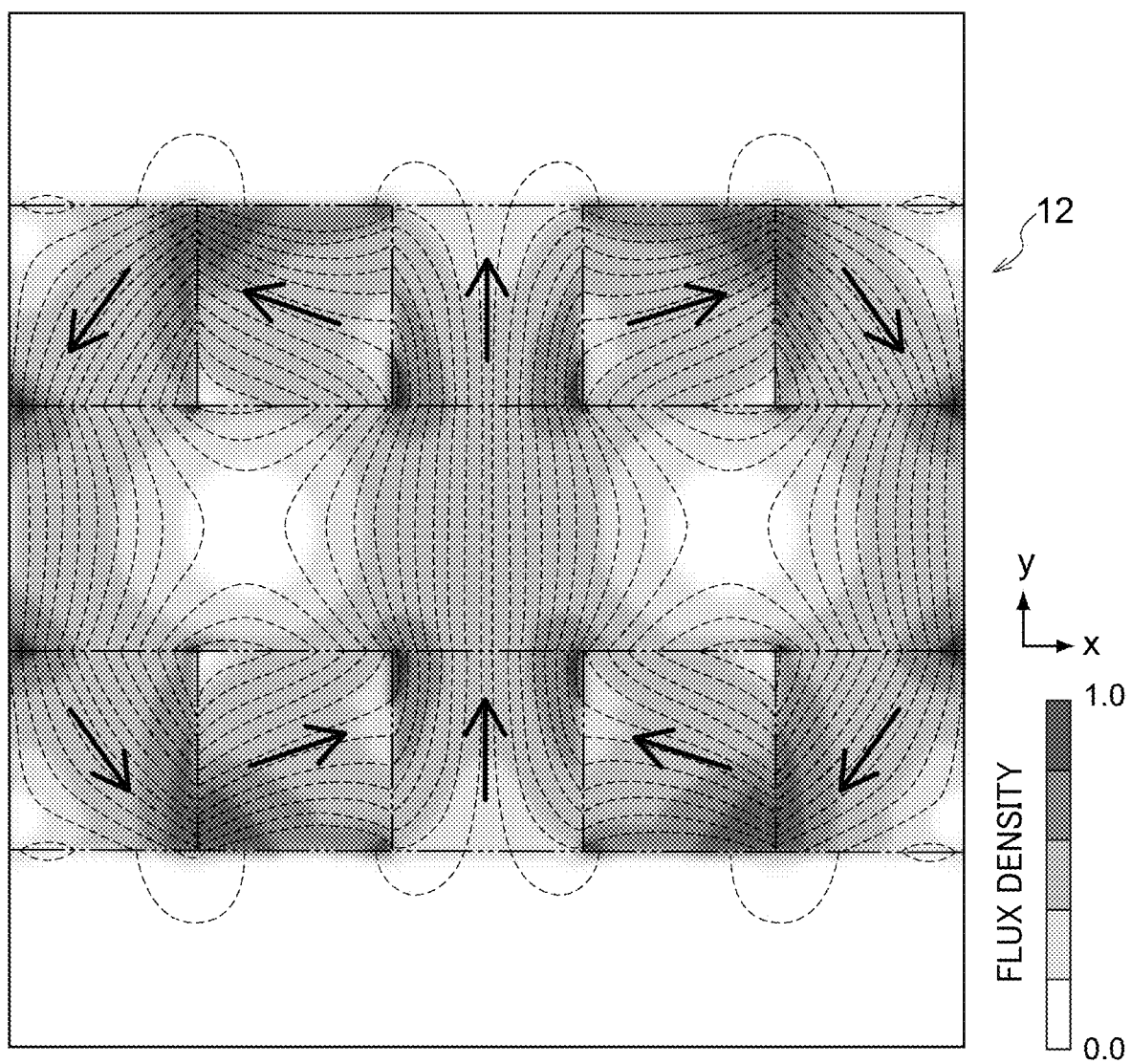
FIG. 4A is a distribution map of magnetic flux and flux density in a field system according to an Example 1.
Figure 4B:
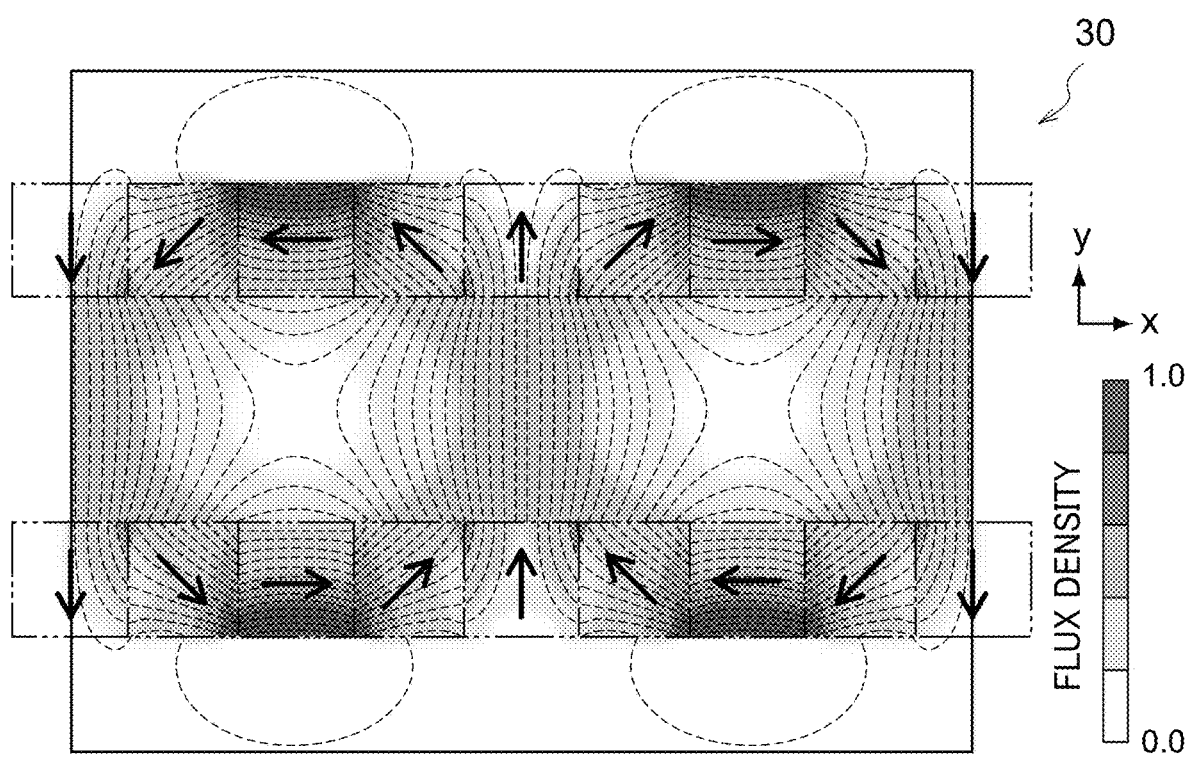
FIG. 4B is a distribution map of magnetic flux and flux density in a field system according to an Example 2.

As Halbach array field systems (dual Halbach array field systems) in which the number of divisions m satisfies m=3·n+2, the field system 12 having a number of divisions m=5 is Example 1, a field system 30 having a number of divisions m=8 is Example 2, with Example 1 illustrated in FIG. 4A, and Example 2 illustrated in FIG. 4B.

Figure 5A:
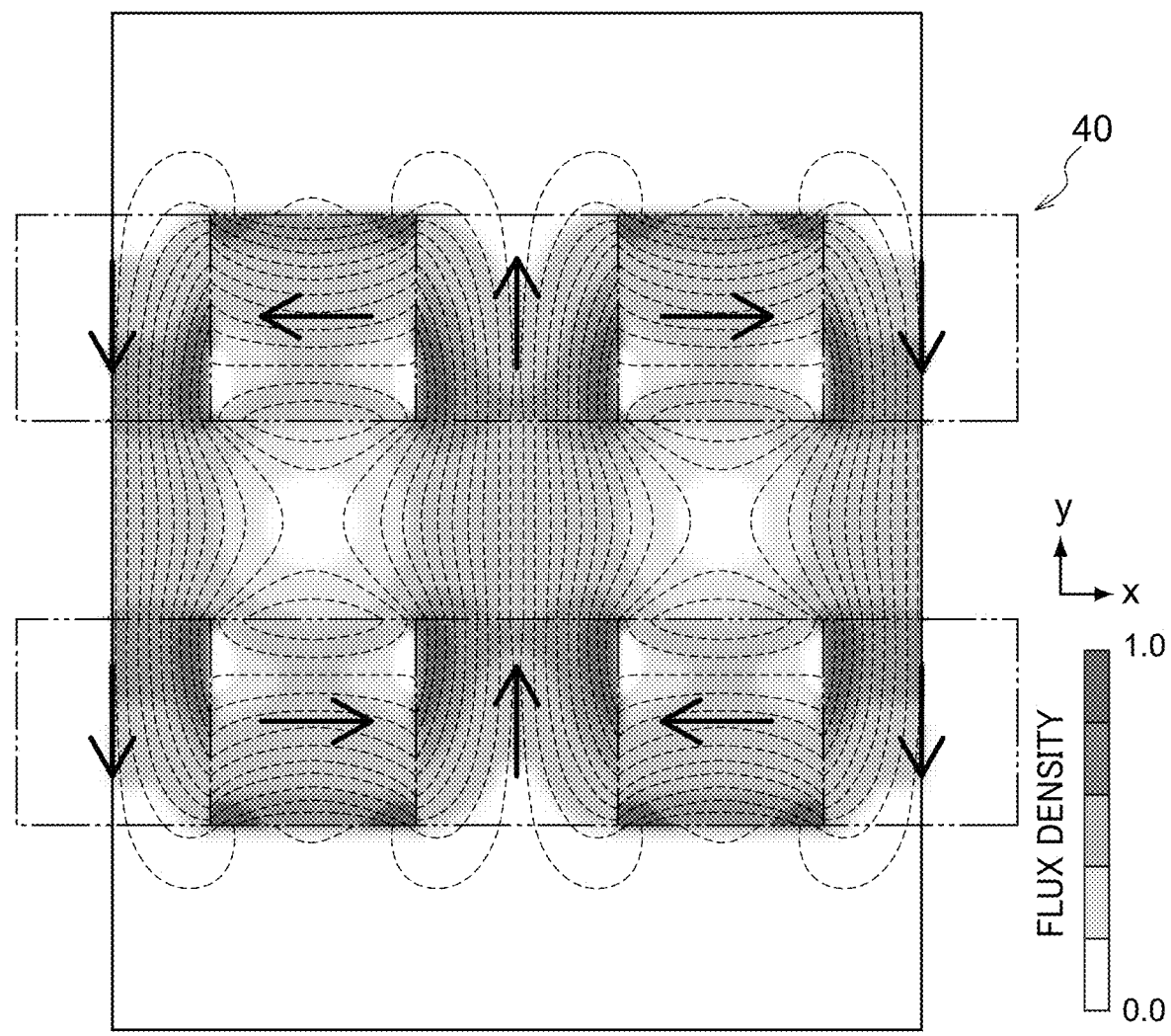
FIG. 5A is a distribution map of magnetic flux and flux density in a field system according to a Comparative Example 1.
Figure 5B:
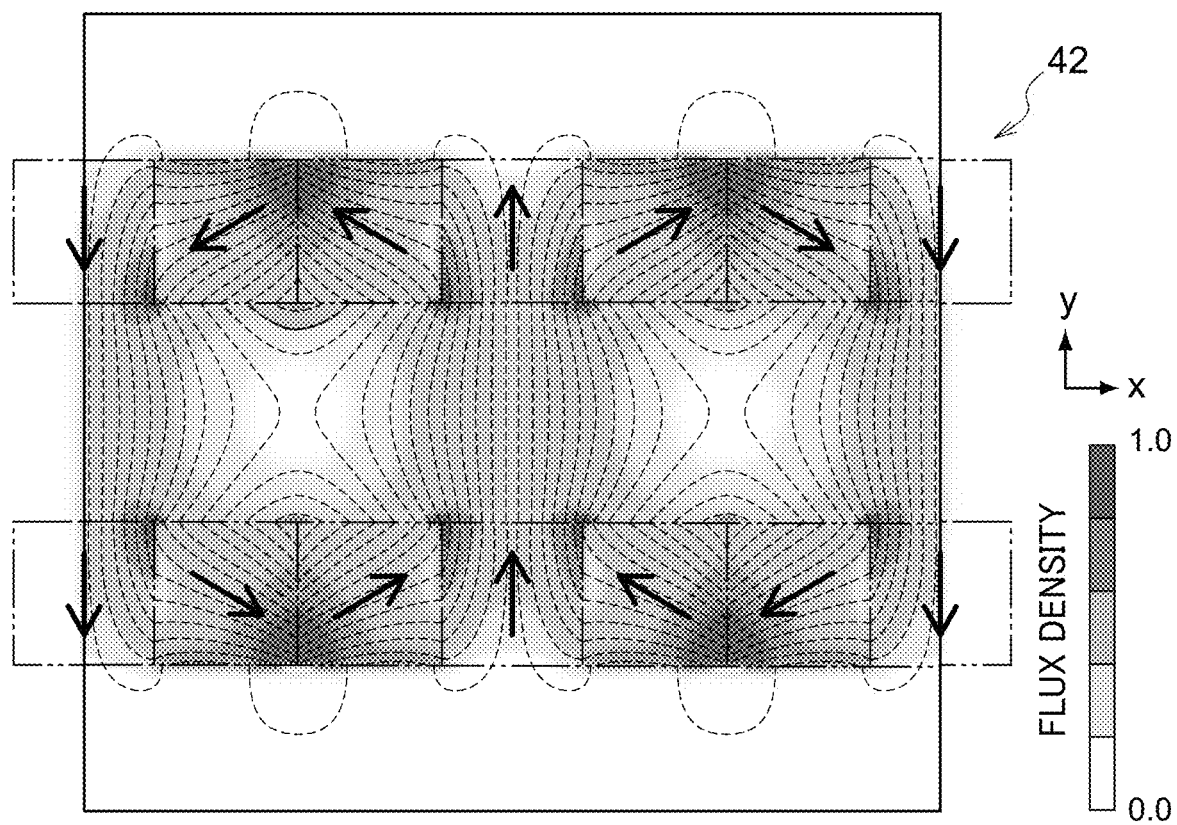
FIG. 5B is a distribution map of magnetic flux and flux density in a field system according to a Comparative Example 2.
Figure 5C:
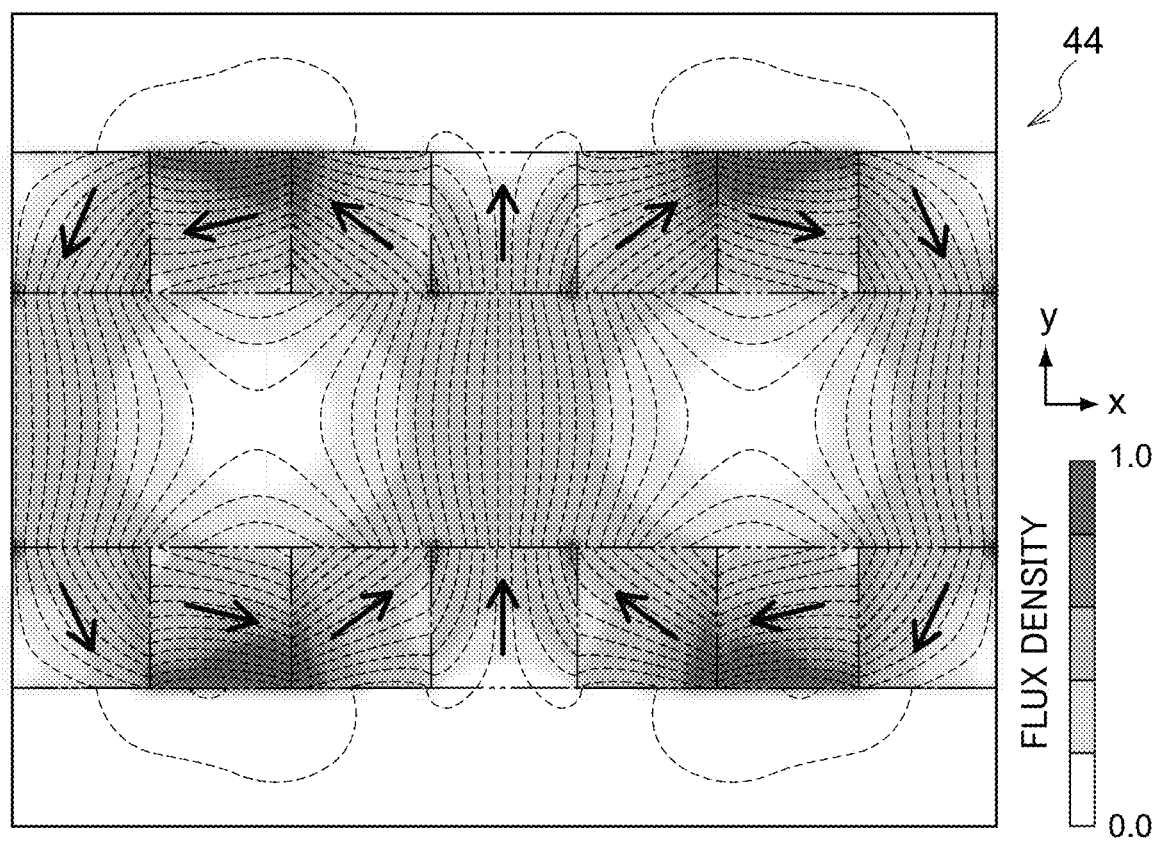
FIG. 5C is a distribution map of magnetic flux and flux density in a field system according to a Comparative Example 3.
Figure 5D:
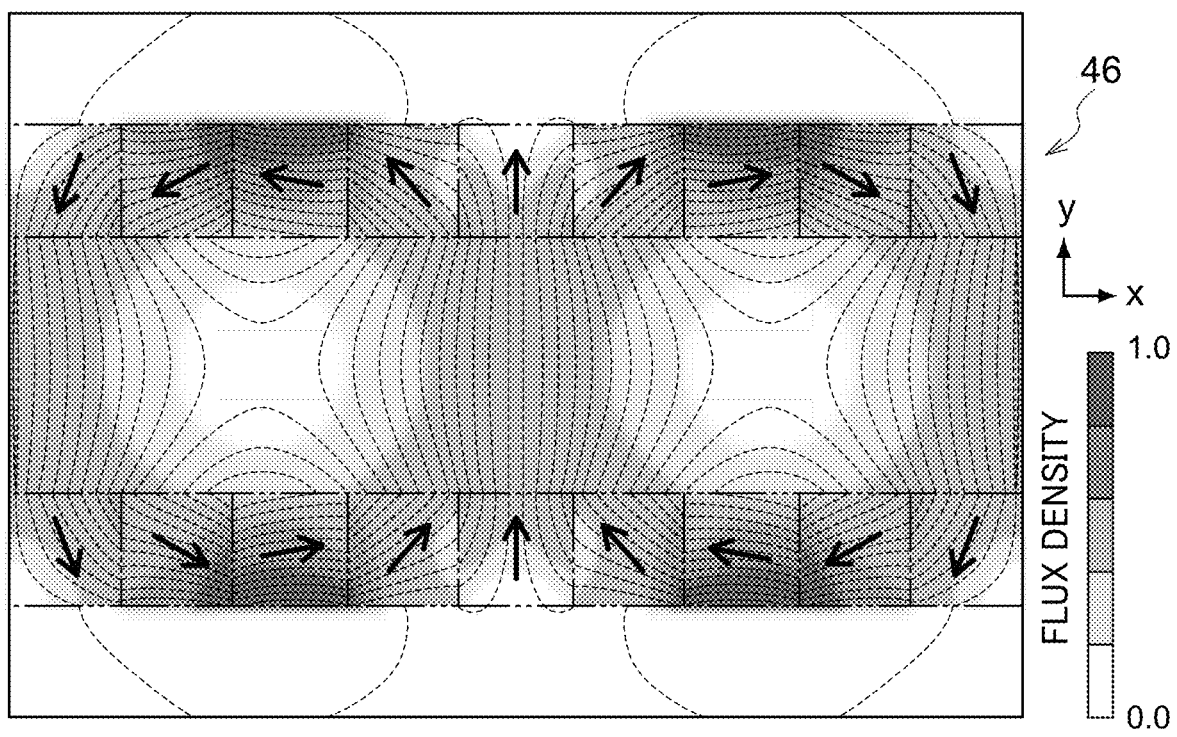
FIG. 5D is a distribution map of magnetic flux and flux density in a field system according to a Comparative Example 4.

Moreover, in comparative examples to the first exemplary embodiment, a field system 40 having a number of divisions m=4 is Comparative Example 1, a field system 42 having a number of divisions m=6 is Comparative Example 2, a field system 44 having a number of divisions m=7 is Comparative Example 3, and a field system 46 having a number of divisions m=9 is a Comparative Example 4. Comparative Example 1 is illustrated in FIG. 5A, Comparative Example 2 is illustrated in FIG. 5B, Comparative Example 3 is illustrated in FIG. 5C, and Comparative Example 4 is illustrated in FIG. 5D. Note that similarly to in the field system 12, the field systems 30, and 40 to 46 employ magnets 26 magnetized so as to obtain magnetization directions with an angle θ based on a setting angle Δ set according to the number of divisions m.

As illustrated in FIG. 4A, FIG. 4B, and FIG. 5A to FIG. 5D, in Example 1, Example 2, and Comparative Example 1 to Comparative Example 4, the flux density changes with electric angle direction in a sinusoidal waveform at a central position in the separation of the Halbach arrays (gap of gap length C). This confirms that the characteristics of a dual Halbach array field system are obtained in Example 1, Example 2, and Comparative Example 1 to Comparative Example 4.

However, in the Halbach arrays that form the dual Halbach array field system, harmonic components (spatial harmonic components) are present in the flux density distribution in the vicinity of (at positions distanced by not more than ½ a side length a of the magnets 26 from) the field system surfaces (magnetized faces). This means that torque ripple is produced in the electric motor 10 when the coils 20 are in close proximity to the field system surfaces.

Figure 6A:
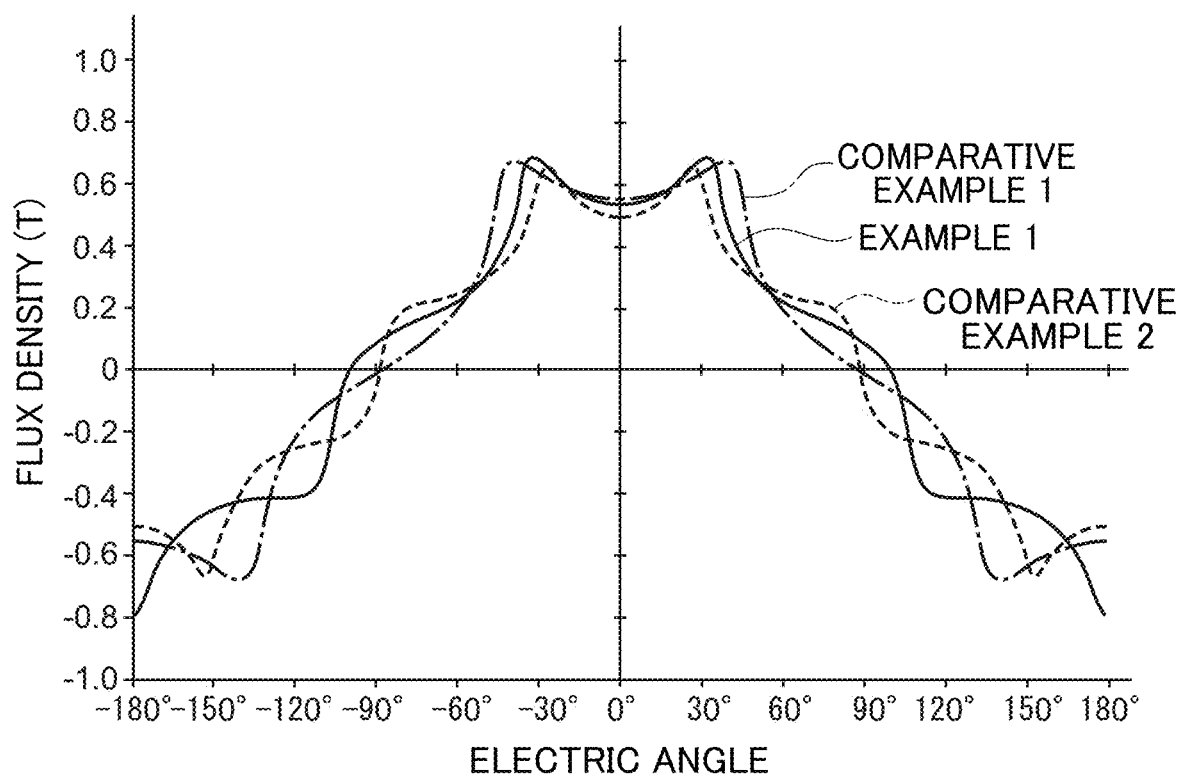
FIG. 6A is a graph illustrating how flux density changes with respect to electric angle in Example 1, Comparative Example 1, and Comparative Example 2.
Figure 6B:
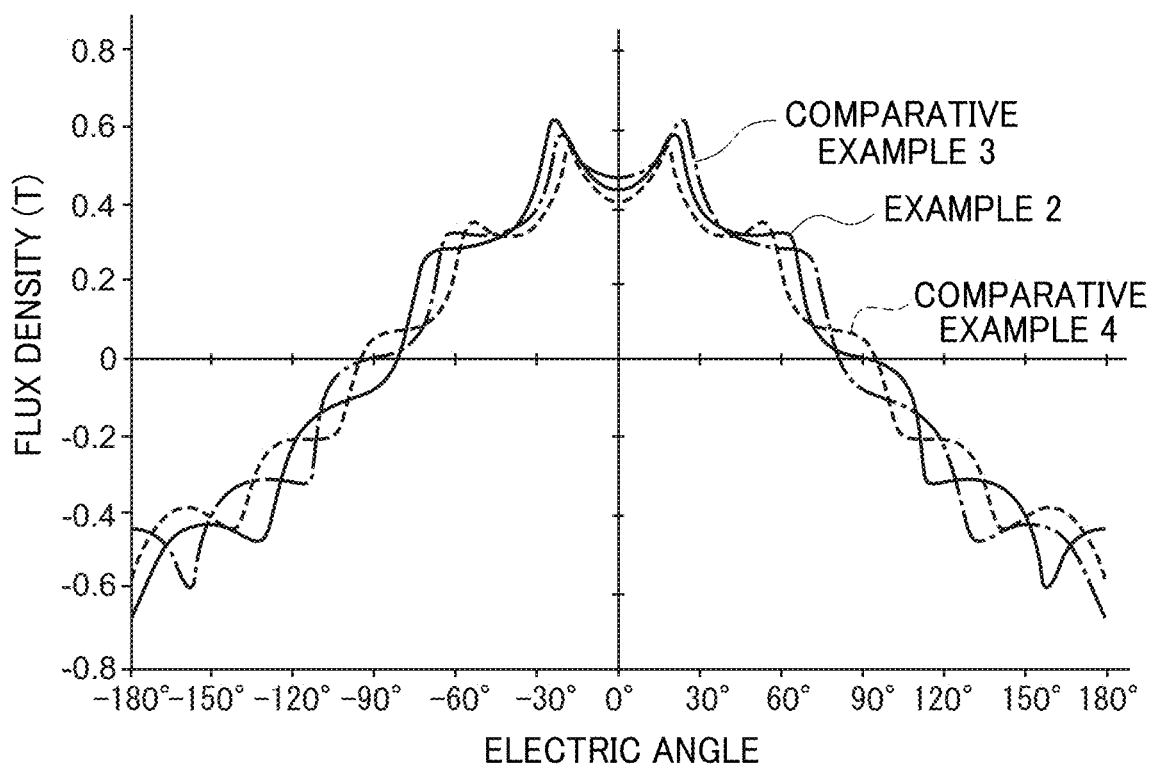
FIG. 6B is a graph illustrating how flux density changes with respect to electric angle in Example 2, Comparative Example 3, and Comparative Example 4.

FIG. 6A and FIG. 6B illustrate how flux density (in tesla, T) changes with respect to electric angle (in degrees) over a range of one cycle's worth of electric angle (a range from −180° to +180°). The changes in flux density in FIG. 4A, FIG. 4B, and FIG. 5A to FIG. 5D are found by performing Fourier transformation on changes to the electric angle direction (arrow x direction) of the density (flux density) at positions, whereof a prescribed distance away from the magnetized faces of the Halbach array, for magnetic flux (magnetic flux in the y direction) interlinking with the coils (not illustrated in the drawings).

Note that the prescribed distance is the distance to the coils from the magnetized faces when the coils are disposed in a spacing that obtains larger output torque without the coil and the magnetized faces making contact during operation at normal manufacturing tolerances. An example thereof is 0.5 mm. Example 1, Comparative Example 1, and Comparative Example 2 are illustrated in FIG. 6A, and Example 2, Comparative Example 3, and Comparative Example 4 are illustrated in FIG. 6B.

As illustrated in FIG. 6A and FIG. 6B, differences arise in how the flux density changes between Example 1, Example 2, and Comparative Example 1 to Comparative Example 4 due to harmonic components (spatial harmonic components) present in the change in flux density.

Figure 7A:
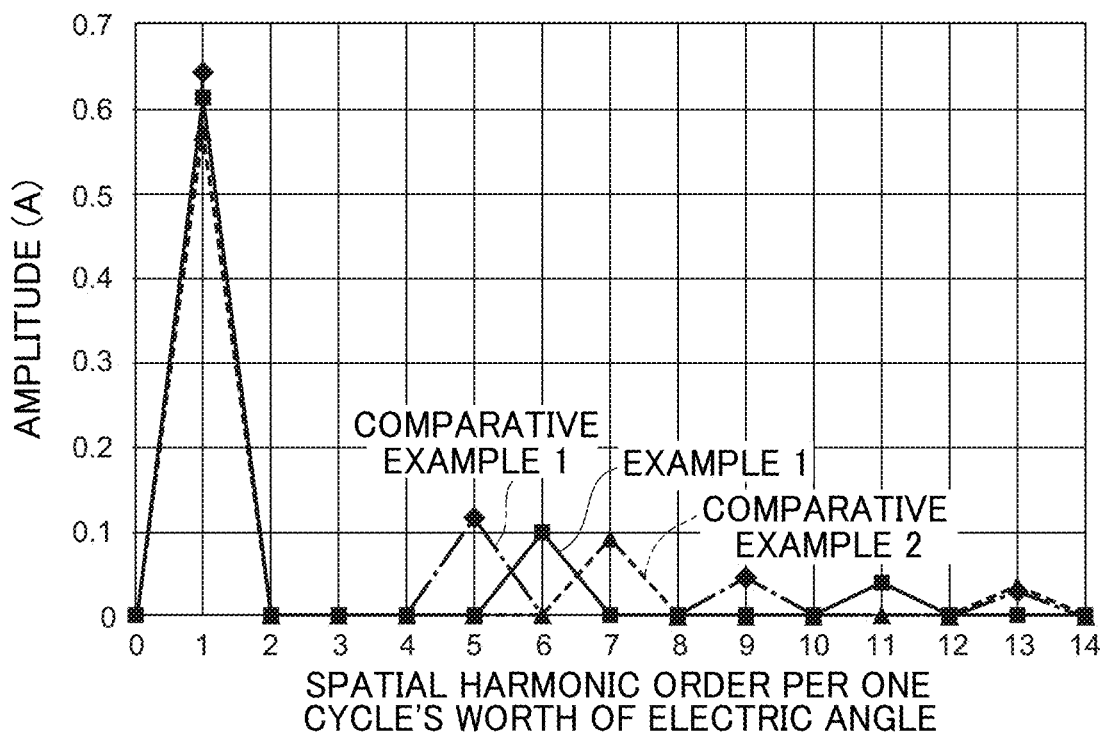
FIG. 7A is a graph illustrating amplitudes against order of spatial harmonic in Example 1, Comparative Example 1, and Comparative Example 2.
Figure 7B:
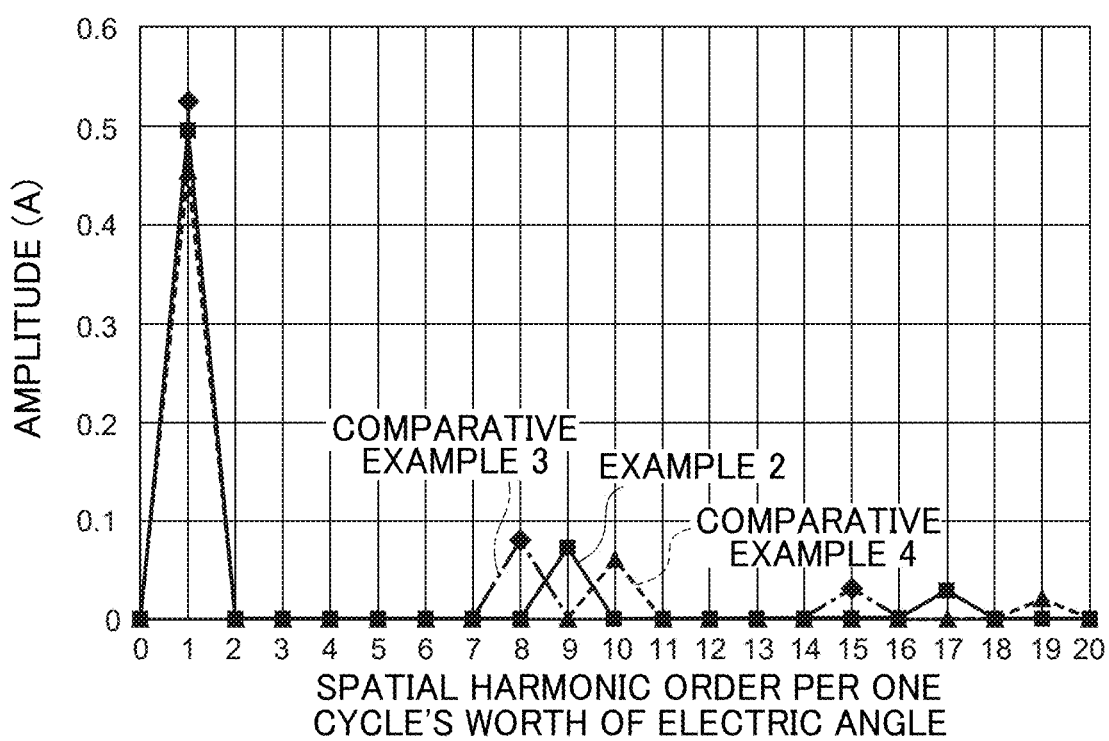
FIG. 7B is a graph illustrating amplitudes against order of spatial harmonic in Example 2, Comparative Example 3, and Comparative Example 4.

FIG. 7A and FIG. 7B illustrate amplitude (A) for each order of spatial harmonic component arising from changes in the flux density at the vicinity of the field system surfaces (magnetized faces). Note that Example 1, Comparative Example 1, and Comparative Example 2 are illustrated in FIG. 7A, and Example 2, Comparative Example 3 and Comparative Example 4 are illustrated in FIG. 7B.

As illustrated in FIG. 7A, the amplitudes of the $5^{th}$ order, $9^{th}$ order, and $13^{th}$ order spatial harmonic components in Comparative Example 1 are present to a greater extent than the amplitudes of other order spatial harmonic components, the amplitudes of the $6^{th}$ order and $11^{th}$ order spatial harmonic components are present to a greater extent than the amplitude of other order spatial harmonic components in Example 1, and the amplitudes of the $7^{th}$ order and $13^{th}$ order spatial harmonic components are present to a greater extent than the amplitudes of other order spatial harmonic components in Comparative Example 2. Moreover, as illustrated in FIG. 7B, the amplitudes of the $8^{th}$ order and $15^{th}$ order spatial harmonic components are present to a greater extent than the amplitude of other order spatial harmonic components in Comparative Example 3, the amplitudes of the $9^{th}$ order and $17^{th}$ order spatial harmonic components are present to a greater extent than the amplitudes of other order spatial harmonic components in Example 2, and the amplitudes of the $10^{th}$ order spatial harmonic components are present to a greater extent than the amplitude of other order spatial harmonic components in Comparative Example 4.

As described above, these orders of the spatial harmonic components correspond to orders computed by m·k+1 with respect to the number of divisions m, wherein k is a positive integer. Thus for the spatial harmonic components in the Halbach arrays, the amplitude is large for orders computed by adding one to a multiple of k times the number of divisions (number of magnet divisions) m (i.e. m·k+1, wherein k is a positive integer).

Figure 8A:
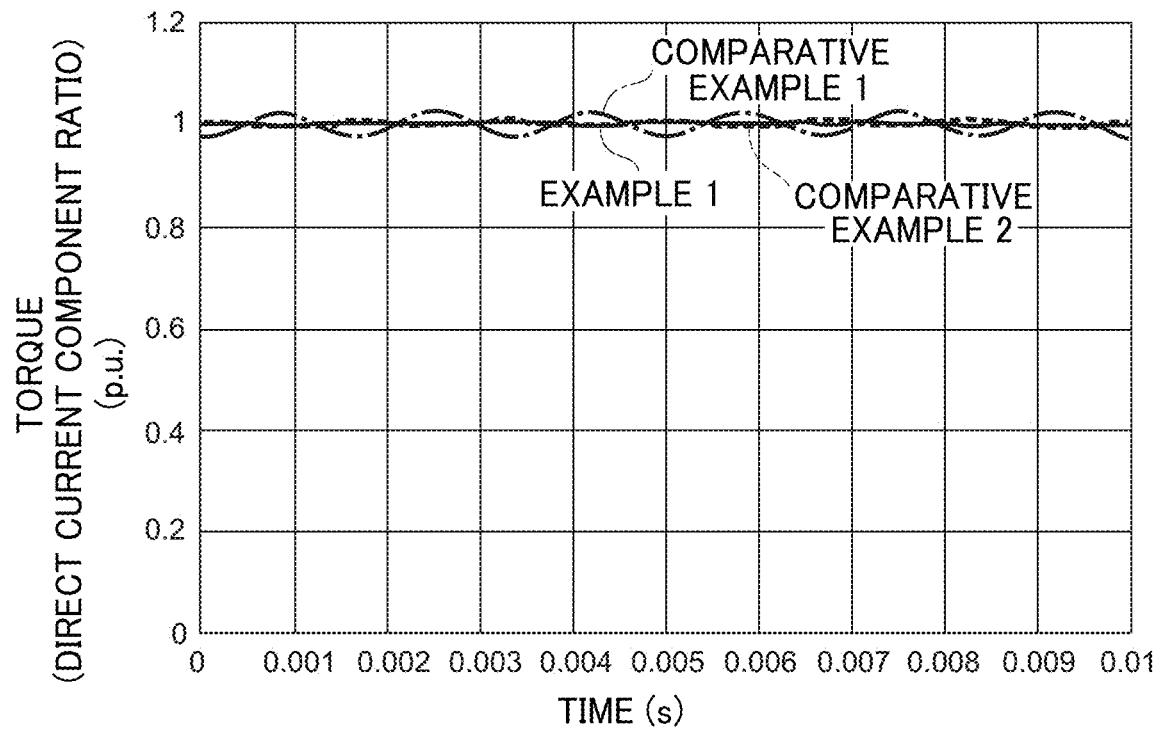
FIG. 8A is a graph illustrating direct current component ratios of torque against time for Example 1, Comparative Example 1, and Comparative Example 2.
Figure 8B:
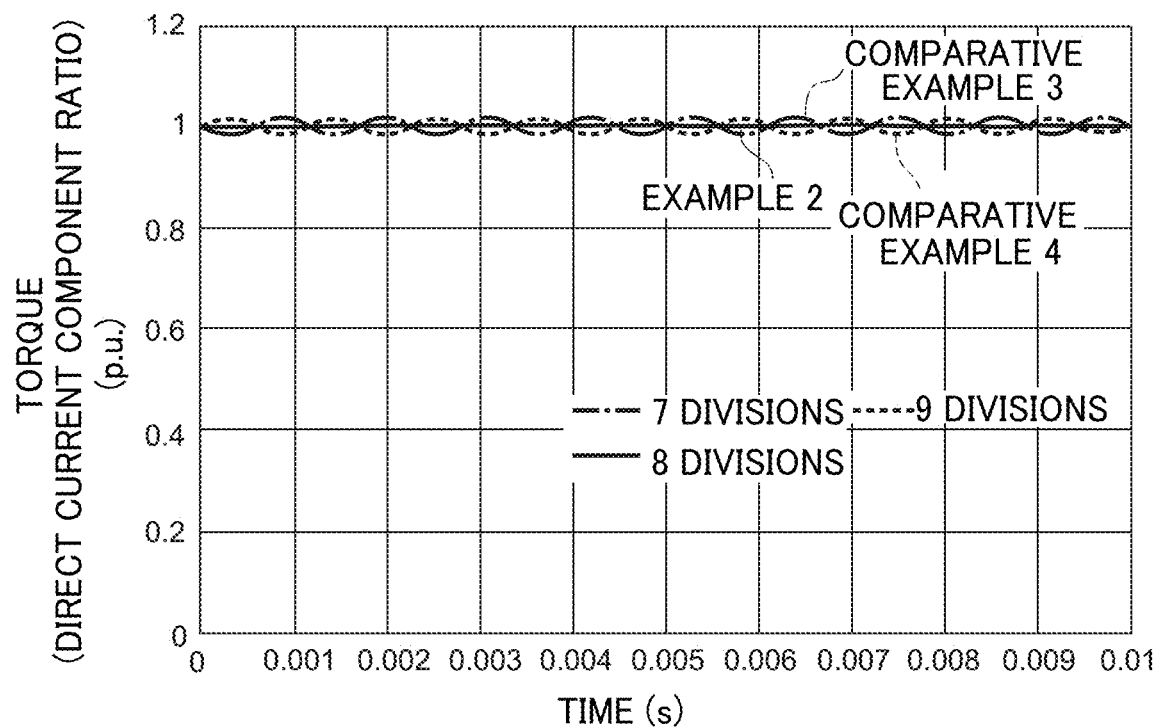
FIG. 8B is a graph illustrating direct current component ratios of torque against time for Example 2, Comparative Example 3, and Comparative Example 4.
Figure 9A:
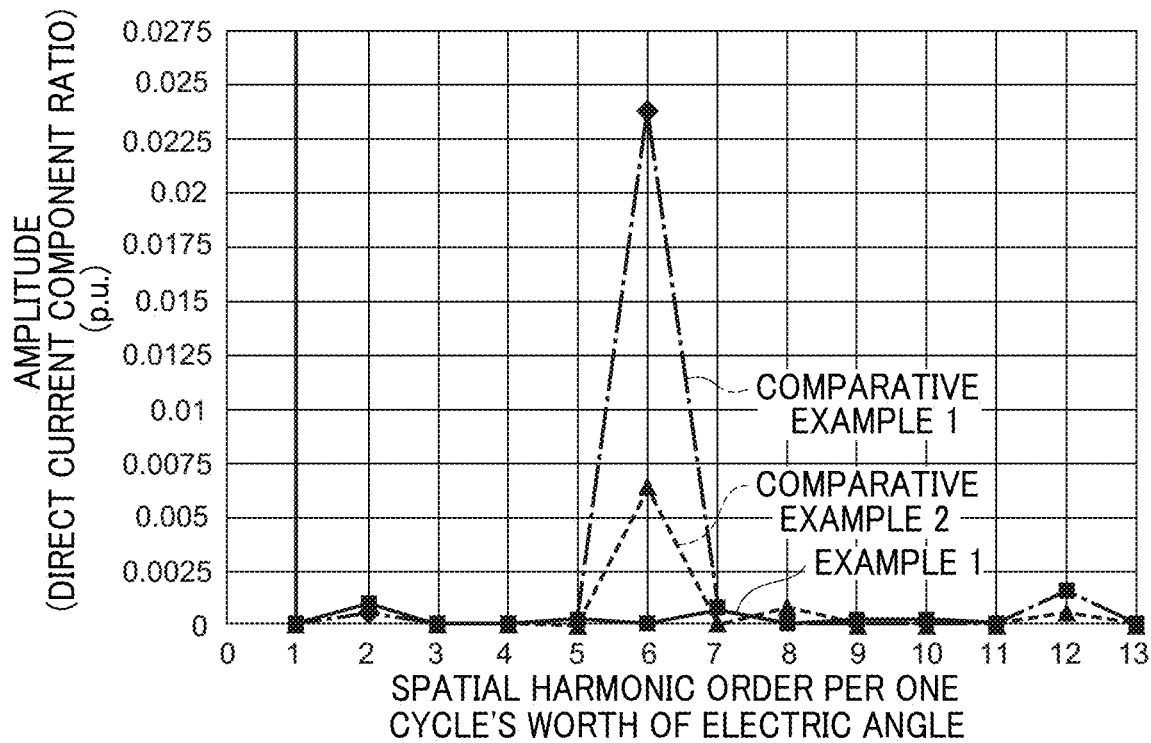
FIG. 9A is a graph illustrating amplitudes (amplitude ratios) against order of spatial harmonic in Example 1, Comparative Example 1, and Comparative Example 2.
Figure 9B:
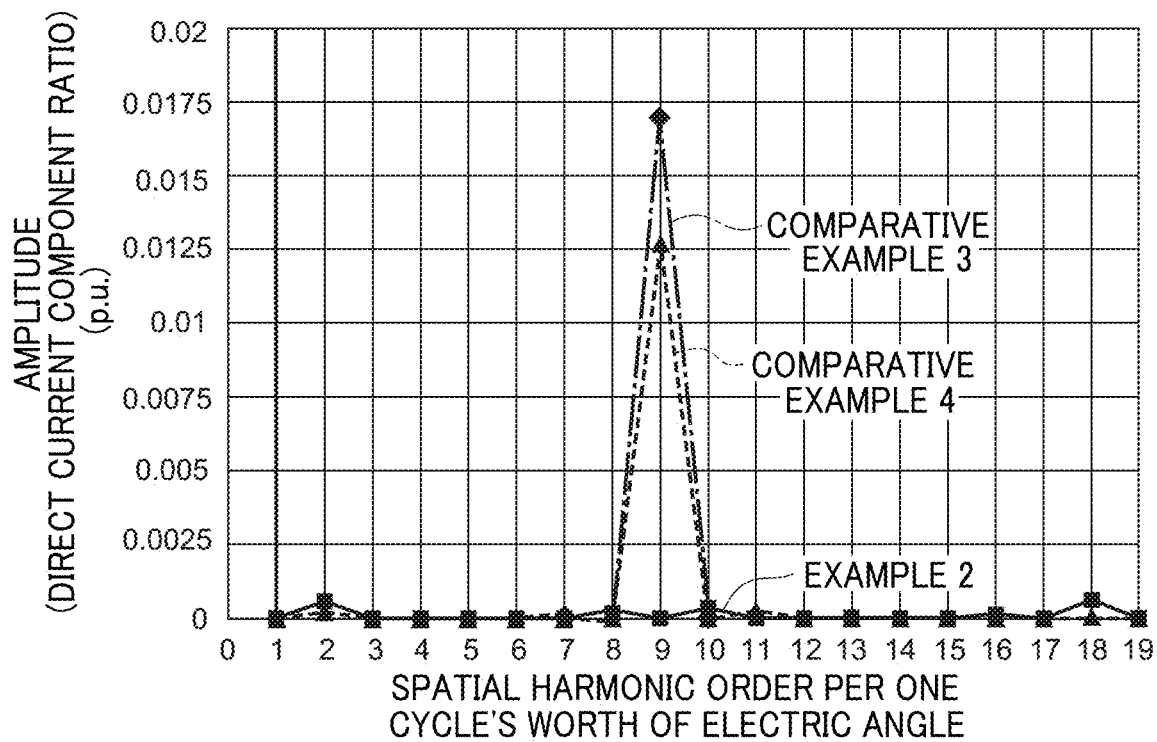
FIG. 9B is a graph illustrating amplitudes (amplitude ratios) against order of spatial harmonic in Example 2, Comparative Example 3, and Comparative Example 4.

FIG. 8A and FIG. 8B illustrate torque direct current component ratios (p.u.) with respect to time for a normalized direct current component in simulations of Example 1, Example 2, and Comparative Example 1 to Comparative Example 4. FIG. 9A and FIG. 9B illustrate amplitude ratios of harmonics (spatial harmonics) per one cycle's worth of electric angle present in timewise changes in the torque direct current component. Note that Example 1, Comparative Example 1, and Comparative Example 2 are illustrated in FIG. 8A and FIG. 9A and Example 2, Comparative Example 3 and Comparative Example 4 are illustrated in FIG. 8B and FIG. 9B.

As illustrated in FIG. 8A and FIG. 8B, there are larger fluctuations in torque in Comparative Example 1 and Comparative Example 2 compared to Example 1, and there are larger fluctuations in torque in Comparative Example 3 and Comparative Example 4 compared to Example 2. The total harmonic distortion (THD) (%) is 0.173 in Example 1 (number of divisions m=5), and is 0.068 in Example 2 (number of divisions m=8). In contrast thereto, the total harmonic distortion (THD) (%) is 1.687 in Comparative Example 1 (number of divisions m=4), is 0.472 in Comparative Example 2 (number of divisions m=6), is 1.213 in Comparative Example 3 (number of divisions m=7), and is 0.897 in Comparative Example 4 (number of divisions m=9).

Moreover, as illustrated in FIG. 9A and FIG. 9B, the amplitudes of the $6^{th}$ order spatial harmonic component are large in Comparative Example 1 and Comparative Example 2, and the amplitudes of the $9^{th}$ order spatial harmonic component are large in Comparative Example 3 and Comparative Example 4. Thus torque ripple caused by the $6^{th}$ order spatial harmonic component is produced in Comparative Example 1 and Comparative Example 2, and torque ripple caused by the $9^{th}$ order spatial harmonic component is produced in Comparative Example 3 and Comparative Example 4. Torque ripple is accordingly produced at positions in close proximity to the magnetized faces in the Halbach arrays.

In the three-phase synchronous motor, from out of the spatial harmonic components present in the flux density per one cycle's worth of electric angle, the torque ripple caused by spatial harmonic components for orders that are multiples of three are suppressed. The $6^{th}$ order and $9^{th}$ order spatial harmonic components are larger in Example 1 in which the number of divisions m=5 and in Example 2 in which the number of divisions m=8. Torque ripple is accordingly suppressed in Example 1 and Example 2. Thus for the electric motor 10 that employs the dual Halbach array field system has a number of divisions m (wherein m is a positive integer) for one cycle's worth of electric angle, torque ripple is suppressed by employing a number computed by adding two to a multiple of three (i.e. m=3·n+2, wherein n is any positive integer).

Moreover, in an electric motor, with regard to the plural magnets 26 that form the Halbach array, spatial harmonic components are produced when differences arise in the cross-sectional shape along the array direction, resulting in torque ripple. In contrast thereto, in the first exemplary embodiment, a similar shape is employed for the cross-sectional shape of cross-sections along the array direction for each of the plural magnets 26, enabling better suppression of spatial harmonic components, and enabling the generation of torque ripple to be suppressed.

Moreover, in a Halbach array (Halbach arrays 22, 24 or the like), the spatial harmonic components dramatically reduce at distances from the vicinity of the field system surfaces (vicinity of the magnetized faces of the magnets) of not less than ½ the one side length (length a) of a square shaped cross-section of the magnets. There is accordingly the possibility to suppress torque ripple by setting a gap g between the coils 20 and the field system surfaces such that g>(a/2). However, setting the gap g between the coils 20 and the field system surfaces such that g>(a/2) results in lower output torque than cases in which the gap g between the coils 20 and the field system surfaces is set such that g≤(a/2).

To address this issue, for the number of divisions m of one cycle's worth of electric angle (wherein m is a positive integer), by employing a configuration therefore of a number computed by adding two to a multiple of three (i.e. m=3·n+2, wherein n is any positive integer), torque ripple is suppressed in the electric motor 10 not only for cases in which the gap g between the coils 20 and the field system surfaces is such that g>(a/2), but also in cases in which the gap g is such that g≤(a/2). Thus torque ripple is suppressed in the electric motor 10 even when disposing the coils 20 in close proximity to the field system surfaces (g≤a/2) in order to raise the output torque, and the generation of vibration and noise caused by vibration is suppressed.

Moreover, even in single Halbach arrays, similar spatial harmonic components are present to those present in dual Halbach arrays at positions not greater than ½ the one side length (length a) of a square shaped cross-section of magnets from the vicinity of the field system surfaces (vicinity of the magnetized faces of the magnets). Thus even in a field system employing a single Halbach array, by employing a configuration in which the number of divisions m (wherein m is a positive integer) of one cycle's worth of electric angle is any number computed by adding two to a multiple of three (i.e. m=3·n+2, wherein n is a positive integer), spatial harmonic components can be suppressed in the vicinity of the field system surfaces, and torque ripple can be suppressed.

In this manner, torque ripple can be suppressed at high precision in the electric motor 10 employing a Halbach array. This means that high precision positioning can be performed when employing the electric motor 10 as various types of positioning motor (positioning servo motor). Moreover, in a motor (electric motor) demanding high rotation speeds, although there is a transition through mechanical resonance frequencies up to the rated rotation speed, vibration when transitioning through the mechanical resonance frequencies is suppressed due to suppressing torque ripple. Thus employing the electric motor in a polisher or in an instrument with high speed rotation enables device vibration and noise caused by such vibration to be suppressed from being generated as the electric motor 10 does not act as an excitation source.

Second Exemplary Embodiment

Detailed explanation follows regarding a second exemplary embodiment of the present invention.

Figure 10:
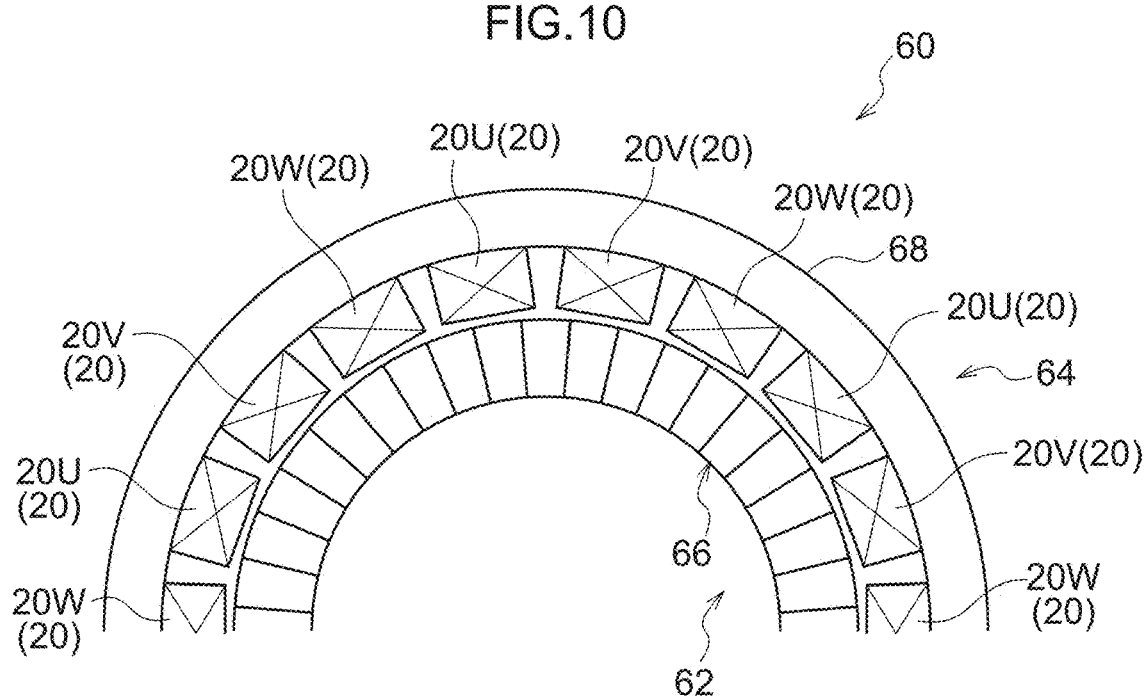
FIG. 10 illustrates a schematic configuration of an electric motor according to a second exemplary embodiment as seen in a plan view of main parts.

FIG. 10 illustrates a schematic configuration of main parts of a three-phase AC motor (hereafter referred to as electric motor 60) serving as an electromagnetic device and a rotary electrical machine according to a second exemplary embodiment, as seen in a plan view along the axial direction.

The electric motor 60 is equipped with an external diameter pillar shaped rotor 62 as a rotor, and a substantially cylindrical shaped stator 64 serving as a stator configuring an armature. In the electric motor 60, the rotor 62 and the stator 64 are coaxially disposed, with the rotor 62 disposed inside the stator 64 and supported by the stator 64 so as to be capable of rotating.

A field system unit 66 is provided at an outer peripheral portion of the rotor 62. A cylindrical shaped outer cylinder section 68 is provided to the stator 64 as a magnetic path forming section. The outer cylinder section 68 is formed with a ring shaped cross-section from a magnetic material (ferromagnetic material) and a yoke made of electromagnetic steel sheet. Plural coils 20 are attached to the stator 64 so as to configure an armature on the inner peripheral face of the outer cylinder section 68. The coils 20 are provided in sets that each include a U-phase coil 20U, a V-phase coil 20V, and a W-phase coils 20W. The electric motor 60 has a concentrated winding in which plural sets of the coils 20 are arranged at the inner periphery of the outer cylinder section 68 at prescribed spacings along the circumferential direction. The coils 20 are air-core coils formed by winding with Litz wire as conductor wire. The coils 20 suppress the generation of eddy current in the conductor wire due to employing Litz wire therefor, thereby suppressing heat generation.

The coils 20 are supplied with the three-phase AC power supplied to the electric motor 10 at a prescribed voltage. When this occurs, an alternating current flows in the sets of coils 20U, 20V, 20W, with a phase that is shifted by steps of 120° over the range of one cycle's worth of electric angle.

A magnetic field is formed in the electric motor 60 by the field system unit 66. In the electric motor 60, the rotor 62 is rotated in the circumferential direction relative to the stator 64 by the three-phase alternating current flowing through the coils 20 (20U, 20V, 20W) which are put inside the magnetic field. When this occurs, the rotor 62 is rotated at a revolution speed corresponding to the frequency of the three-phase alternating current.

Detailed explanation follows regarding the field system unit 66 of the rotor 62 and the outer cylinder section 68 of the stator 64.

A Halbach array is employed in the field system unit 66 according to the second exemplary embodiment. Halbach arrays include single Halbach arrays (single Halbach array field systems) and dual Halbach arrays (dual Halbach array field systems). A single Halbach array is employed in the field system unit 66 of the electric motor 60.

In a three-phase AC motor, the amount of flux linkage that interlinks with the coils 20 can be increased by placing the surface (magnetized face) of the field system unit 66 and the coils 20 in close proximity to each other, enabling a large output torque to be achieved. However, spatial harmonic components become larger in the vicinity of the surface of the field system unit 66, and torque ripple caused by the spatial harmonic components readily occurs. Moreover, the amplitude of the spatial harmonic components effects the torque ripple, due to the amplitude of lower order spatial harmonic components out of the spatial harmonic components being greater than the amplitude of higher order spatial harmonic components, the lower order spatial harmonic components particularly effect torque ripple.

Moreover, in a three-phase synchronous motor, torque ripple caused by spatial harmonic components for orders that are multiples of three (i.e. $3^{rd}$ order, $6^{th}$ order, ...) are suppressed for spatial harmonic components present in the flux density per one cycle's worth of electric angle. A single Halbach array in which the number of divisions m is any number (positive number) of 3 or greater is preferably employed in the electric motor 60. Moreover, in the electric motor 60, preferably a configuration is adopted in which the number of divisions m (wherein m is a positive integer) is any number computed by adding two to a multiple of three (i.e. m=3·n+2, wherein n is a positive number, e.g. m=5, 8, 11, or the like).

In the Halbach array of the field system unit 66 in the electric motor 60, the number of divisions m employed is any number computed by adding two to a multiple of three. This thereby enables the electric motor 60 to suppress spatial harmonic components in the vicinity of the surface of the field system unit 66, and to suppress torque ripple even more effectively.

However, in the second exemplary embodiment, in order to simplify explanation, a configuration of single Halbach array of the field system unit 66 will be described in which the number of divisions m is not a number computed by adding two to a multiple of three, and instead the number of divisions m is four (number of divisions m=4), i.e. merely a number of three or greater.

Figure 11:
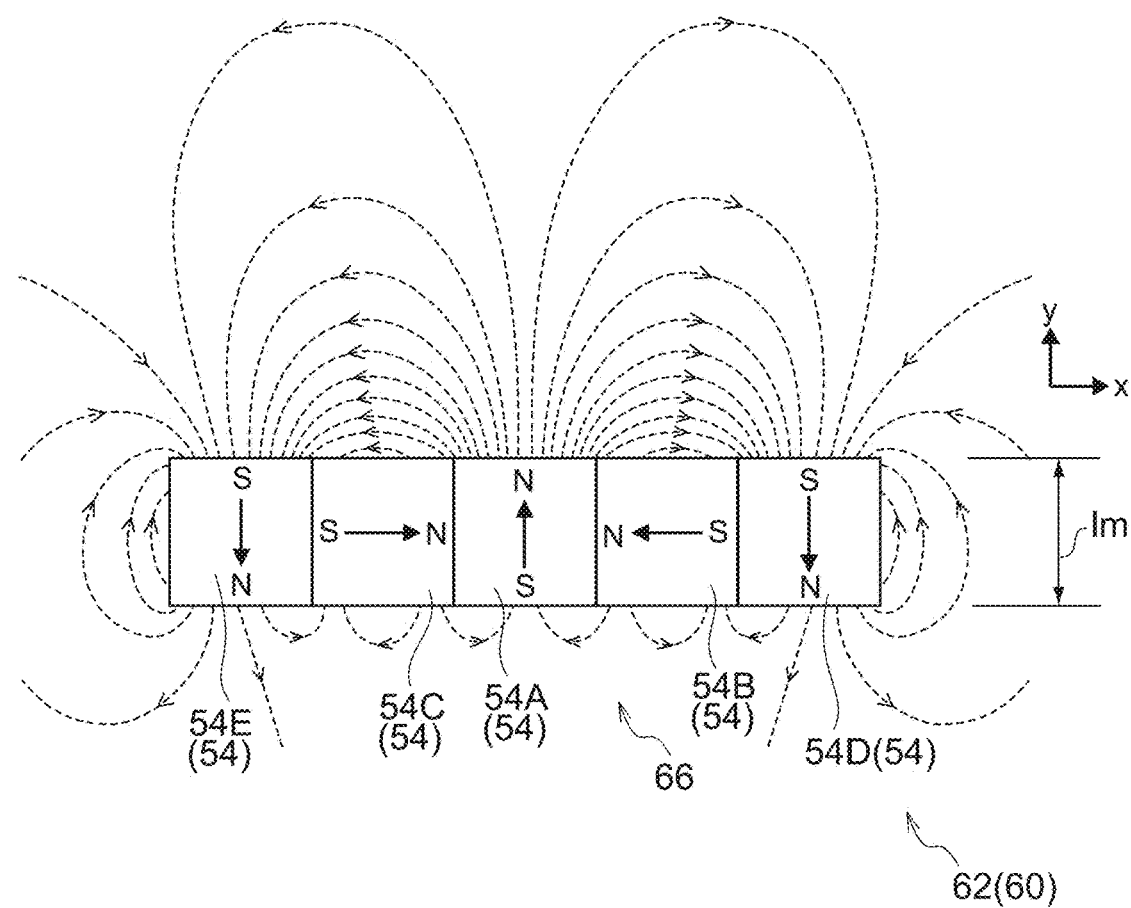
FIG. 11 is an opened-out view illustrating a schematic configuration of a Halbach array.

FIG. 11 illustrates a single Halbach array employed in the field system unit 66 illustrated by an opened-out view opened-out into a parallel shape. Explanation follows regarding Halbach arrays (single Halbach arrays and dual Halbach arrays), with reference to FIG. 11. Note that one side in the electric angle direction of the Halbach array is indicated by the arrow x in the drawings, and the direction of lines of magnetic force that contribute to torque generation in the electric motor 60 are indicated by the arrow y. In the electric motor 60, the radial direction outside of the rotor 62 and the stator 64 is indicated by the arrow y, and one side in the circumferential direction in the rotor 62 and the stator 64 is indicated by the arrow x.

In the Halbach array, the magnets 54 are configured with substantially rectangular cross-sections (substantially cuboidal shapes), and in the Halbach array the magnets 54 are arrayed while changing their magnetization direction by steps of a prescribed angle. When this is performed, the magnets 54 are arrayed while sequentially changing their magnetization directions by steps of a setting angle $\Delta$, wherein the setting angle $\Delta$ is an angle (a divided angle) computed by dividing one cycle's worth of electric angle ($2\pi=360°$) by an integer n of 3 or more.

In the field system unit 66, for example, the number of divisions m=4, and the setting angle $\Delta$ in the Halbach array is 90° ($\Delta=90°=360°/4$). In the field system unit 66 configured by the single Halbach array in which the number of divisions m=4, the magnets 54 are arrayed while changing their magnetization directions in sequence by the setting angle $\Delta$ ($\Delta=90°$) and are arrayed so as to place the magnets 54 in close contact with each other.

In the single Halbach array field system, a magnet 54A is disposed with a magnetization direction facing toward one side in a direction intersecting with the array direction, and magnets 54B, 54C are disposed on the two array direction sides of the magnet 54A with their magnetization directions facing toward the magnet 54A. Moreover, magnets 54D, 54E that are adjacent to the magnets 54B, 54C on the opposite side to the magnet 54A side, are oriented with their magnetization directions facing in the opposite direction to the magnetization direction of the magnet 54A. Note that at the opposite side of the magnet 54D to the magnet 54B side, a magnet 54 (a magnet 54 similar to the magnet 54C) is disposed that has a magnetization direction facing toward the opposite side to that of the magnet 54B, and at the opposite side of the magnet 54E to the magnet 54C side, a magnet 54 (a magnet 54 similar to the magnet 54B) is disposed that has a magnetization direction facing toward the opposite side to that of the magnet 54C (both these magnets are omitted from illustration).

The single Halbach array field system thereby suppresses the strength of the magnetic field in the opposite direction to the magnetization direction of the magnet 54A, and a comparatively strong magnetic field is formed in the magnetization direction of the magnet 54A compared to that on the opposite side to the magnetization direction of the magnet 54A.

Moreover, a dual Halbach array (dual Halbach array field system) is configured by single Halbach array field systems being disposed so as to face each other separated by a prescribed spacing (corresponding to gap length C in the first exemplary embodiment). When doing so, the N pole of the magnet 54A on one of the single Halbach array field systems faces toward the S pole of the magnet 54A of the other of the single Halbach array field systems. Moreover, in the other single Halbach array field system, due to an opposing strong magnetic field being formed on the side toward the one single Halbach array field system, the magnet 54B and the magnet 54C are disposed so as to be switched around with respect to the magnet 54A.

This results in a comparatively strong magnetic field being formed between the pair of single Halbach array field systems in the dual Halbach array field system, i.e. comparatively strong compared to that of a single Halbach array field system. In a rotary electrical machine, a double cylinder structure may be adopted in which one of a pair of single Halbach array field systems is disposed on the radial direction inside (inner rotor side), and the other of the pair of single Halbach array field systems is disposed on the radial direction outside (outer rotor side).

Figure 12A:
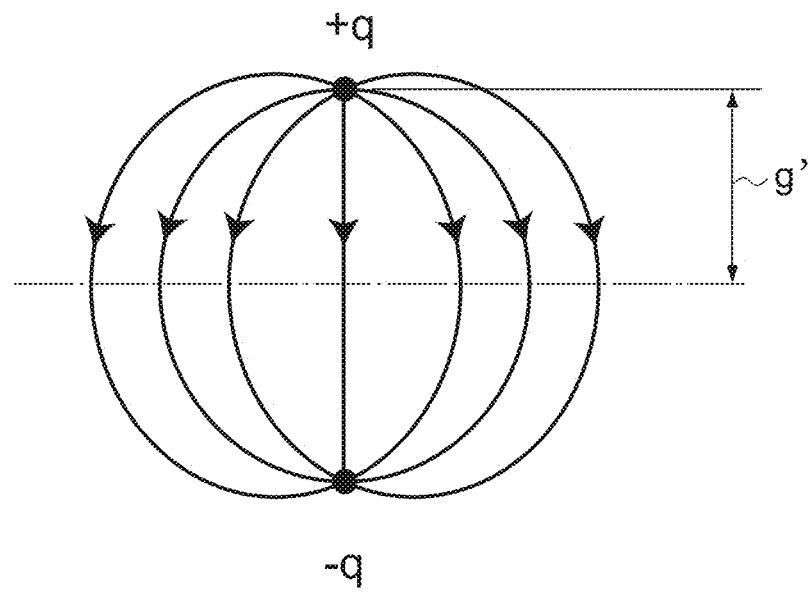
FIG. 12A is a schematic diagram to explain a method of mirror charges, and schematically illustrates lines of electric force between positive and negative point charges.
Figure 12B:
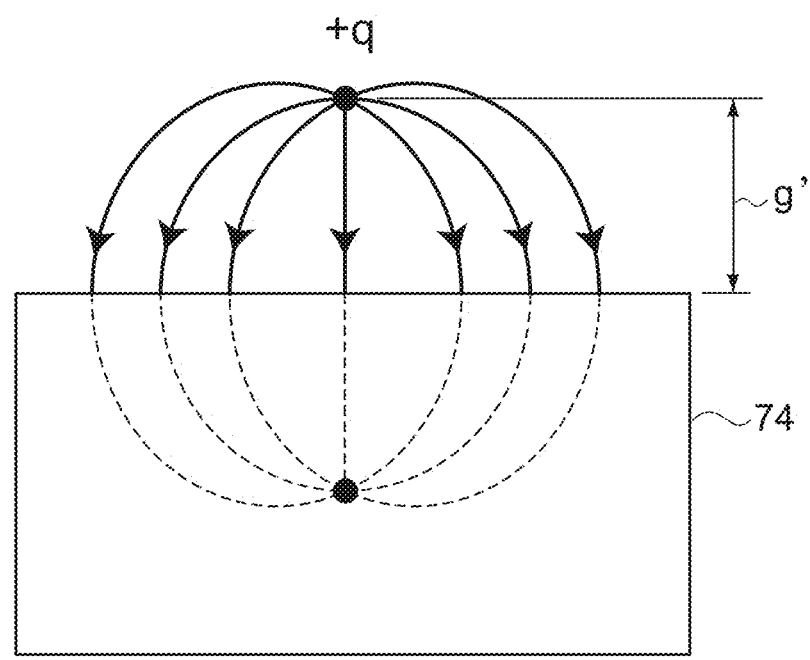
FIG. 12B is a schematic diagram to explain a method of mirror charges, and schematically illustrates lines of electric force between a point charge and a conductor.

FIG. 12 and FIG. 12B illustrate a schematic configuration of a method of mirror charges (method of image charges). FIG. 12A illustrates a state in which positive and negative point charges +q, −q face each other at a distance 2g'. FIG. 12B illustrates a state in which a positive point charge +q faces a conductor (total conductor) 74 at a distance g'.

The lines of electric force between the point charge +q and the point charge −q, as illustrated in FIG. 12A, are symmetrical (have plane symmetry) at a central position (gap central position) between the point charge +q and the point charge −q. If, from this state, one of the point charges +q, −q is replaced by the conductor 74 from the central position, then the resulting lines of electric force (see FIG. 12B) are equivalent to the lines of electric force in the original scenario.

Such a method of mirror charges is also valid for magnetic fields that have similar properties, and in the case of a magnetic field, a magnetic material (ferromagnetic material) is substituted for the conductor 74. Thus, one of the single Halbach array field systems from out of the pair of single Halbach array field systems in a dual Halbach array field system can be replaced by a magnetic material at the central position of the pair.

As illustrated in FIG. 10, the entire periphery of the rotor 62 is surrounded by the outer cylinder section 68 of the stator 64, and the outer peripheral face of the field system unit 66 faces toward the inner peripheral face of the outer cylinder section 68. Thus in a case in which the spacing between the field system unit 66 (the outer peripheral face of the field system unit 66) and the inner peripheral face of the outer cylinder section 68 is a gap length G, then a similar distribution of flux is obtained between the field system unit 66 and the outer cylinder section 68 to that of a dual Halbach array field system having single Halbach array field systems arranged as a pair with a gap length 2G (equivalent to the gap length C in the first exemplary embodiment).

Figure 13A:
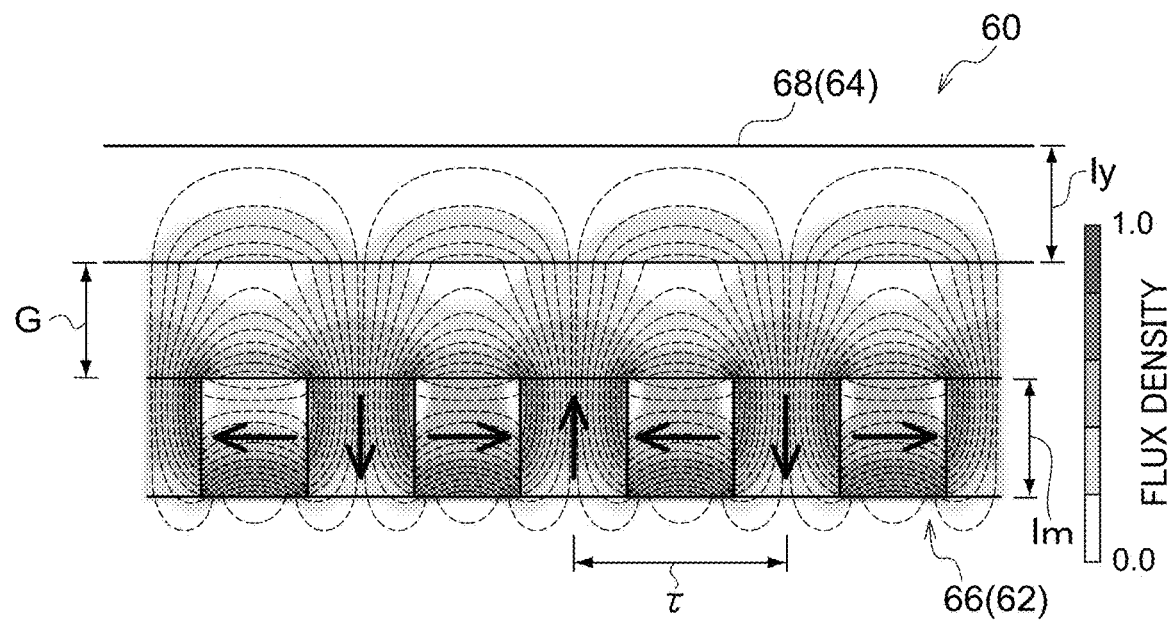
FIG. 13A is a schematic diagram illustrating distributions of flux density and magnetic flux in a single Halbach array field system.
Figure 13B:
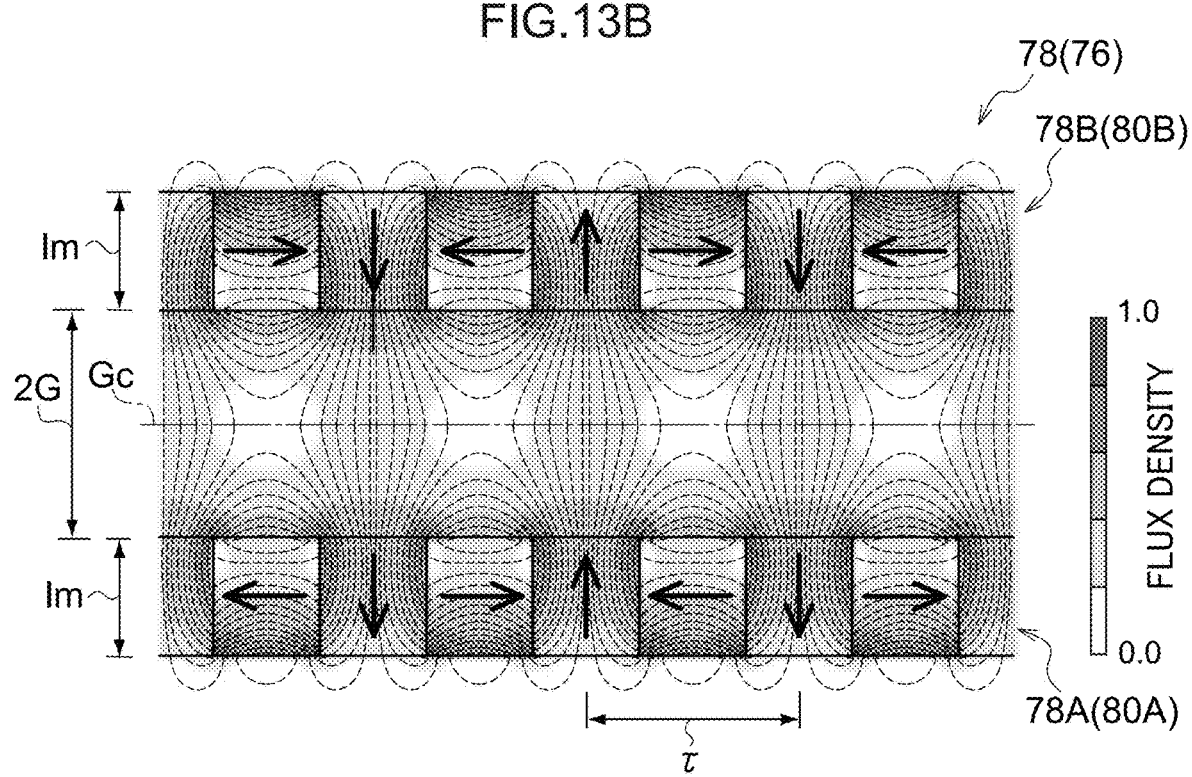
FIG. 13B is a schematic diagram illustrating distributions of flux density and magnetic flux in a dual Halbach array field system.

FIG. 13A is a schematic diagram illustrating distributions of flux density and magnetic flux in state in which the field system unit 66 of the rotor 62 and the outer cylinder section 68 of the stator 64 have been opened out into a straight line shape. Moreover, FIG. 13B is a schematic diagram illustrating as a comparative example distributions of flux density and magnetic flux for a state in which a field system unit 78 of an electric motor 76 employing a dual Halbach array field system has been opened out into a straight line shape. Note that gap length G in FIG. 13A is the spacing between the field system unit 66 (the magnetized face thereof) and the outer cylinder section 68 (the surface thereof).

The dual Halbach array field system of the field system unit 78 in the electric motor 76 is, similarly to the field system unit 66, provided with a pair of single Halbach array field systems configured by plural magnets 54 (54A to 54E). Gap length 2G (twice the gap length G) is the spacing in the pair between the single Halbach array field systems.

As illustrated in FIG. 13A, in the field system unit 66, the outer cylinder section 68 employing the magnetic material is arranged with a gap center Gc (see FIG. 13B) between the pair of single Halbach array field systems in the dual Halbach array field system. The distribution of flux density and the distribution of magnetic flux between the field system unit 66 and the outer cylinder section 68 is accordingly similar to the distribution of flux density and the distribution of magnetic flux between the gap center Gc and one of the single Halbach array field systems in the field system unit 78 of the electric motor 76.

As illustrated in FIG. 10, the coils 20 of the stator 64 are disposed on the field system unit 66—side face of the outer cylinder section 68 and are attached to the outer cylinder section 68. This means that relative movement in the circumferential direction relative to the field system unit 66 is possible for the coils 20 inside the magnetic field formed by the field system unit 66.

Figure 14A:
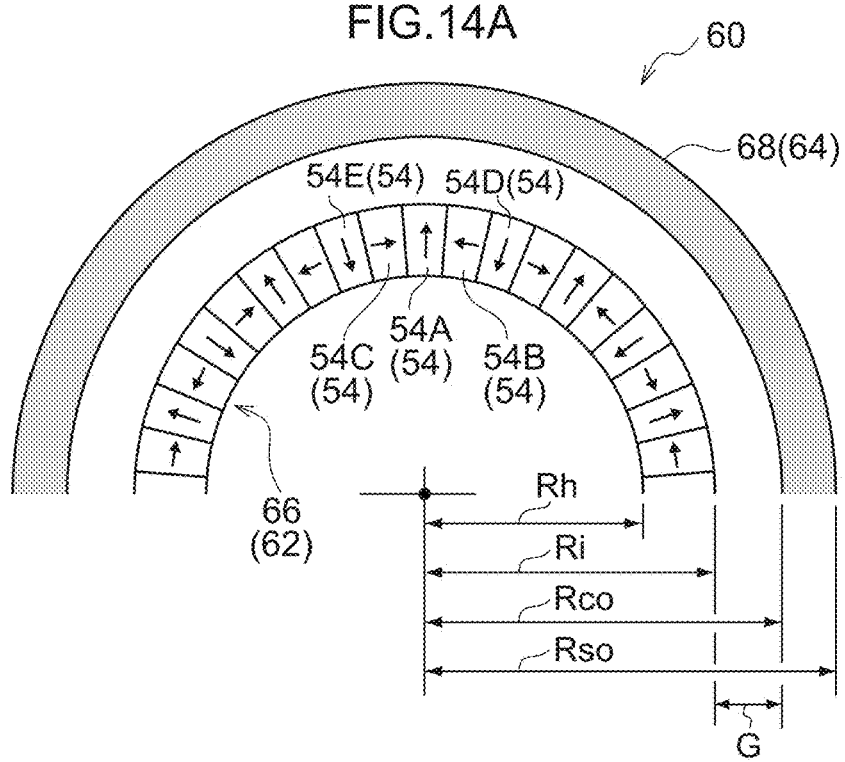
FIG. 14A is a plan view along an axial direction of a field system unit in an electric motor according to the second exemplary embodiment.

The gap length G in the electric motor 60 will now be explained. FIG. 14A is a plan view along an axial direction of main parts of the electric motor 60 employing a single Halbach array field system, and FIG. 14B illustrates as a comparison a plan view along an axial direction of main parts of the electric motor 76 employing a dual Halbach array field system (see FIG. 13B).

As illustrated in FIG. 14A, the electric motor 60 is provided with the field system unit 66 employing a single Halbach array in the rotor 62, and the outer cylinder section (magnetic material) 68 of the stator 64 is provided at the radial direction outside of the field system unit 66.

Figure 14B:
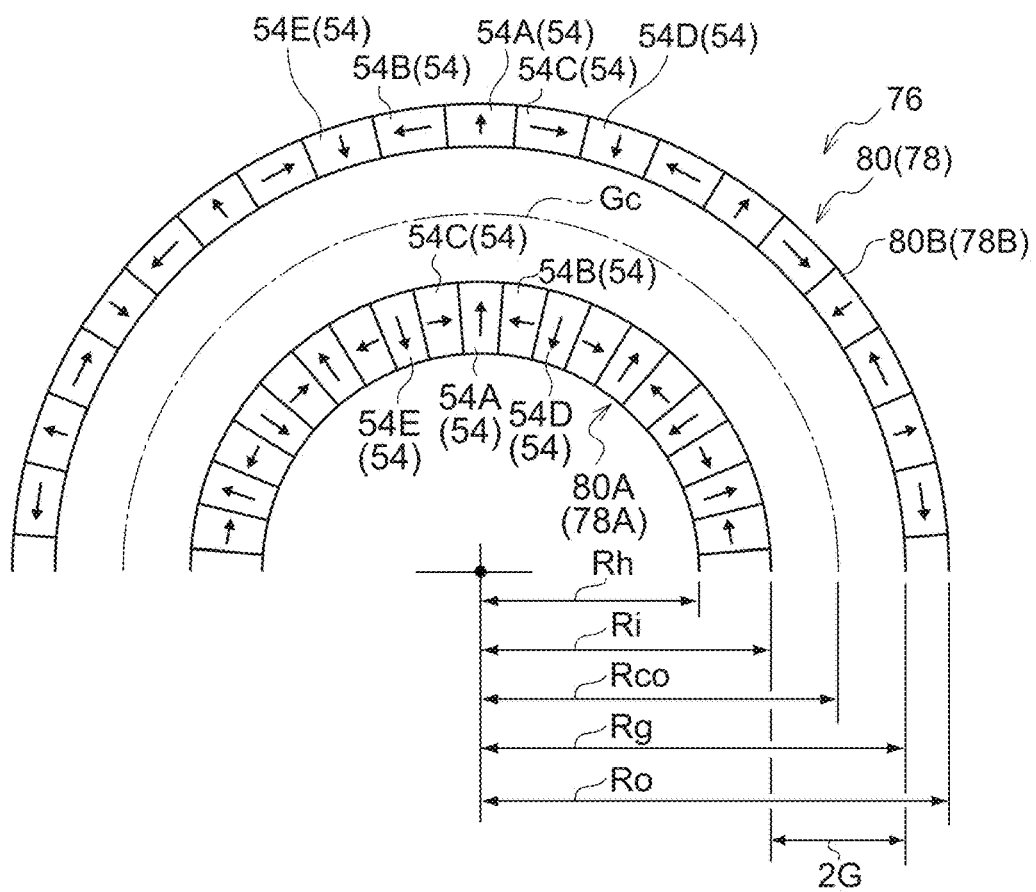
FIG. 14B is plan view along an axial direction of a field system unit in an electric motor according to a comparative example to the second exemplary embodiment.

In contrast thereto, as illustrated in FIG. 14B, a rotor 80 of the electric motor 76 is configured with a double cylinder structure provided with an inner rotor 80A and an outer rotor 80B. In the rotor 80 the inner rotor 80A and the outer rotor 80B rotate as a single body. Three-phase coils (not illustrated in the drawings) are disposed in the electric motor 76 between the inner rotor 80A and the outer rotor 80B. A field system unit 78A employing a single Halbach array field system is provided in the inner rotor 80A, and a field system unit 78B employing a single Halbach array field system is provided in the outer rotor 80B. The field system units 78A, 78B are cylindrical in shape and have the same basic configuration as the field system unit 66.

In the electric motor 60 and the electric motor 76, the same number of magnets 54 are employed to form each of the single Halbach array field systems. One circle of the rotors 62, 80 is divided into a number of divisions Nm, and the magnets 54 are disposed at each division position. Note that the number of the magnets 54 in one cycle's worth of electric angle is the same number as the number of divisions m in one cycle's worth of electric angle, and due to the single Halbach array field systems having N cycles worth of electric angle, each of the rotors 62, 80 has the number Nm of the magnets 54.

The dual Halbach array field system is deformed from a standard parallel shape, in which the magnets 54 have square shaped cross-sections (cuboids), to a cylinder shape. Equal area deformation is performed for such deformation, such that the bottom of the y direction flux density distribution does not shift from the gap center Gc.

In the equal area deformation, the relationships expressed in the following Equation (5) to Equation (12) are satisfied, wherein αi is a ratio of areas of the radial direction cross-section of the magnets 54 of the inner field system unit 78A to the cross-section of the same bodies prior to deformation, αo is a ratio of areas of the radial direction cross-section of the magnets 54 of the outer field system unit 78B to the cross-section of the same bodies prior to deformation, Sg is ½ the total area of the radial direction cross-section of magnets in the field system unit 78A and the field system unit 78B, a' is a ratio of area of a gap radial direction cross-section with respect to a mean cross-sectional area in the radial direction of the magnets 54 of the inner field system unit 78A and the magnets 54 of the outer field system unit 78B, and lm is one side length of the magnets 54 when converted into magnets 54 of square shaped cross-section prior to deformation.

$$\alpha_i = \frac{2(\pi R_{c0}^2 - \pi R_i^2)}{a' S_g} \quad (5)$$

$$\alpha_o = \frac{2(-\pi R_{c0}^2 + \pi R_g^2)}{a' S_g} \quad (6)$$

$$\alpha_i S_g = -\pi R_h^2 + \pi R_i^2 \quad (7)$$

$$\alpha_o S_g = -\pi R_g^2 + \pi R_o^2 \quad (8)$$

$$a' S_g = \pi R_g^2 - \pi R_i^2 \quad (9)$$

$$R_{c0} = \frac{R_g + R_i}{2} \quad (10)$$

$$l_m = \frac{2\pi R_{c0}}{N_m} \quad (11)$$

$$S_g = N_m l_m^2 \quad (12)$$

Namely, in a dual Halbach array field system in which Halbach array field systems (single Halbach array field systems) face each other across a prescribed gap, the ratio of the spatial volume between the gap center Gc and one Halbach array field system to the spatial volume between the gap center Gc and the other Halbach array field system is similar (equivalent) to the ratio of the volume of the one Halbach array field system to the volume of the other Halbach array field system.

Thus even between the field system units 78A, 78B that have each been equal-area-deformed into cylindrical shapes, a ratio of the spatial volume (volume) between the gap center Gc and the field system unit 78B to the spatial volume (volume) between the gap center Gc and the field system unit 78A maintains a similar (substantially equivalent) relationship to the ratio of the volume of the field system unit 78B to the volume of the field system unit 78A.

In the dual Halbach array field system, the cross-sections of each of the equal-area-deformed permanent magnets are fan shaped, having a radial direction outside circular arc length longer than a radial direction inside circular arc length. Moreover, in the equal area deformation, the permanent magnets of the radial direction inside field system unit 78A have a mean value of the radial direction outside circular arc length and the radial direction inside circular arc length in the fan shaped cross-sections that is a mean value smaller than a difference between a radial direction outside circular arc radius Ri and a radial direction inside circular arc radius Rh.

The relationships expressed by the following Equation (13) to Equation (17) are satisfied by lm, Ro, Ri, Rg, and Rh.

$$l_m = \frac{2\pi R_{c0}}{N_m} \qquad (13)$$

$$R_o = R_{c0}\sqrt{\frac{N_m^2 + 2(2+a')N_m\pi + a'(2+a')\pi^2}{N_m^2}} \qquad (14)$$

$$R_i = R_{c0} - \frac{a'\pi R_{c0}}{N_m} \qquad (15)$$

$$R_g = R_{c0} + \frac{a'\pi R_{c0}}{N_m} \qquad (16)$$

$$R_h = R_{c0}\sqrt{\frac{N_m^2 - 2(2+a')N_m\pi + a'(2+a')\pi^2}{N_m^2}} \qquad (17)$$

Wherein in the electric motor 76 the principle variables can be expressed by Rc0, Nm, and a'. When this approach is adopted, then a' is a value expressing the maximum amount of flux linkage with respect to the total mass of magnets 54, and is determined for each electric motor 76.

By employing each of the values set for the electric motor 76 in this manner (particularly Rh, Ri, Rc0), the position of the inner peripheral face of the outer cylinder section 68 with respect to the field system unit 66 of the electric motor 60 can be set. Moreover, a gap length G is obtained from G=(Rc0–Ri) =(Rg–Ri)/2.

The pole pitch $\tau$ in a pair of Halbach arrays is $\tau$=m·lm/2 as determined from the number of divisions m and the one side length lm of the magnets 54. Moreover, the pole pitch $\tau$ at the gap center Gc is obtained from the number of divisions in one cycle Nm and the radius Rc0 of the gap center Gc by $\tau$=(m·π·Rc0)/Nm.

In a dual Halbach array, the gap length 2G to obtain the maximum amount of flux linkage at the gap center Gc is in a range of 0.5 to 2.0 times the pole pitch $\tau$ (0.5·$\tau$≤2G≤2.0·$\tau$), and the gap length 2G set by the above relationship equations also falls within the range of 0.5 to 2.0 times the pole pitch $\tau$.

The gap length G in the electric motor 60 may be set to a multiple of from 0.25 times to 1.0 times the pole pitch $\tau$ (0.25·$\tau$≤G≤1.0·$\tau$), and the gap length G is preferably smaller than the pole pitch $\tau$.

However, a radial direction thickness ly of the outer cylinder section 68 of the stator 64 is a thickness (dimension) determined such that the maximum flux density inside the outer cylinder section 68 does not reach the flux density of the field system unit 66.

Figure 15:
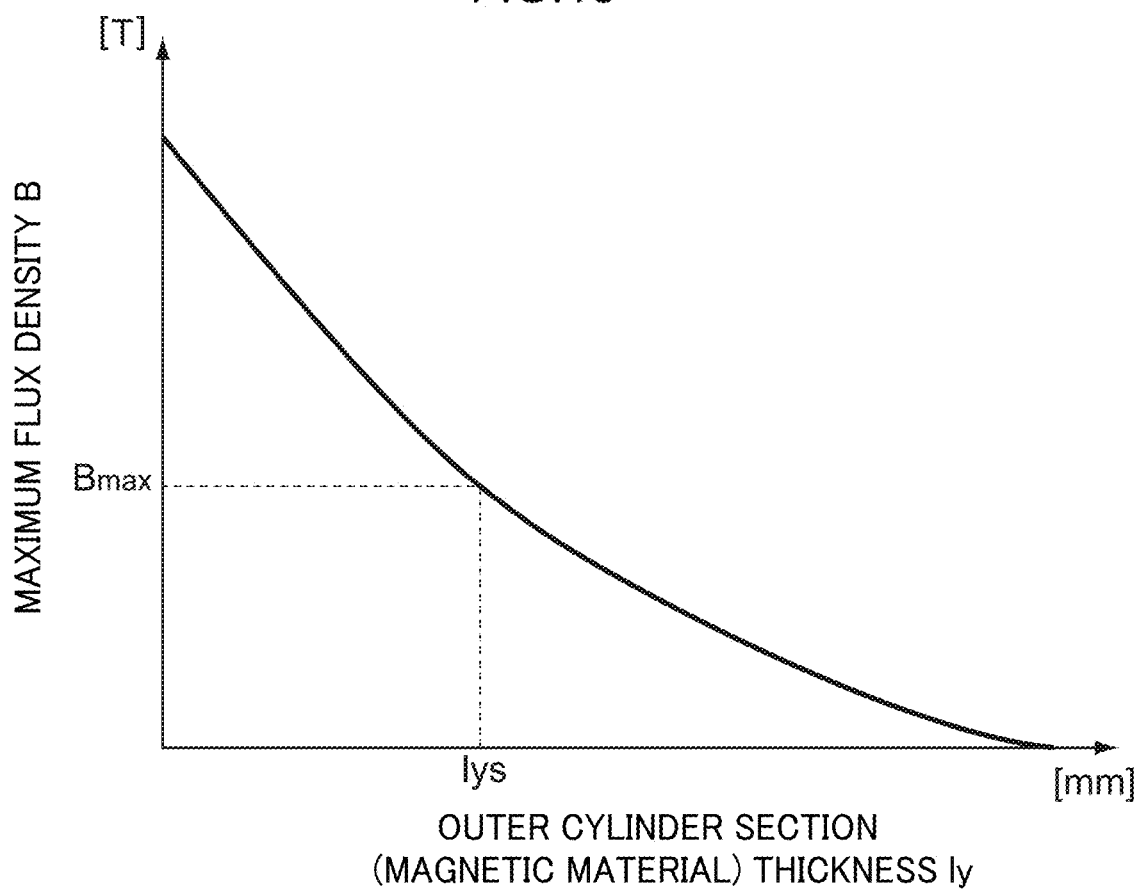
FIG. 15 is a graph schematically illustrating how maximum flux density changes with respect to a thickness of an outer cylinder section.

FIG. 15 illustrates a relationship between a maximum flux density B inside a magnetic material with respect to a thickness ly of the magnetic material (electromagnetic steel sheet). In a magnetic material the maximum flux density B decreases as the thickness ly gets thicker. The thickness ly of the outer cylinder section 68 may be set thicker than a thickness lys of saturated flux density Bmax, so that the flux density formed by the field system unit 66 does not reach the saturated flux density Bmax (ly>lys).

In the electric motor 60 configured in this manner, the rotor 62 is rotated by supplying three-phase alternating current (AC power) at a prescribed voltage to the coils 20 (20U, 20V, 20W) provided to the stator 64 and disposed in the magnetic field formed by the field system unit 66 of the rotor 62.

The coils 20 in the electric motor 60 are air-core coils, enabling the inductance of the coils 20 to be made small, enabling back electromotive force produced by the coils 20 to be suppressed, and thereby enabling a higher rated rotation speed. Moreover, production of cogging torque in the electric motor 60 is also prevented by configuring the coils 20 with air-core coils.

Figure 16:
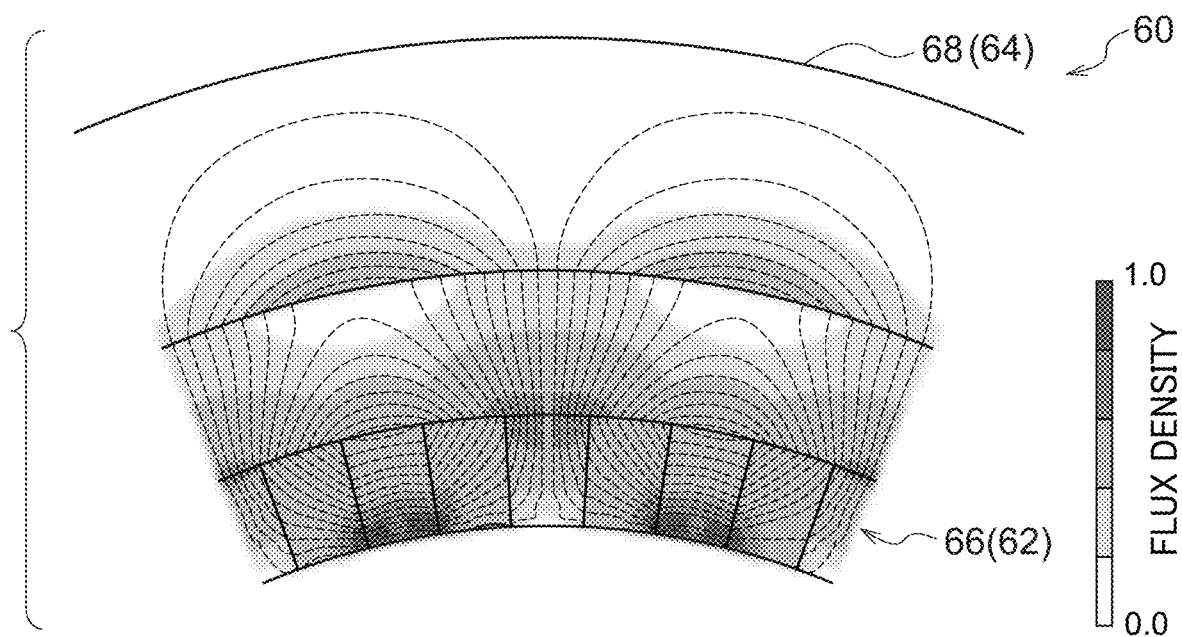
FIG. 16 is a schematic diagram illustrating distributions of flux density and magnetic flux in an electric motor according to the second exemplary embodiment.

However, in the electric motor 60, the field system unit 66 is configured by a single Halbach array field system, and the field system unit 66 is housed in the outer cylinder section 68 employing a magnetic material. FIG. 16 is a schematic diagram illustrating a distribution of flux density and a distribution of flux formed between the rotor 62 and the stator 64 of the electric motor 60.

As illustrated in FIG. 16, a magnetic field (flux density and distribution of flux) generated between a single Halbach array field system and gap center Gc in a dual Halbach array field system is formed between the field system unit 66 and the outer cylinder section 68 where the coils 20 are disposed.

In a dual Halbach array field system, the distribution of flux is symmetrical at the gap central position (gap center Gc), enabling a method of mirror charges to be employed. Thus by replacing the space at the radial direction inside of the gap central position or the space at the radial direction outside thereof with magnetic material, a flux distribution is obtained with the single Halbach array field system and the magnetic material that approximates to that of a dual Halbach array field system.

Thereby in the electric motor 60 employing the single Halbach array field system, a magnetic field can be formed that is similar to that when a dual Halbach array field system is employed. An advantageous effect is accordingly obtained by the electric motor 60 that is the advantageous effect of low torque ripple exhibited by a dual Halbach array field system.

Moreover, the flux density changes is a sinusoidal waveform at the gap central position in a dual Halbach array field system, such that there are zones present where the spatial harmonic components are extremely small. In the electric motor 60, the outer cylinder section 68 employing magnetic material is provided at the zones of the dual Halbach array field system where the spatial harmonics are extremely small, and torque ripple caused by spatial harmonic components is suppressed in the electric motor 60. When doing so, by setting the thickness ly of the outer cylinder section 68 in the electric motor 60 to a thickness as which magnetic saturation does not occur, the outer cylinder section 68 is able to suppress generation of spatial harmonic components caused by magnetic saturation. Thus in the electric motor 60 vibrations causing torque ripple and cogging torque and noise caused by such vibrations are suppressed from being generated, by being suppressed from low rotation speed bands over an entire range to high rotation speed bands and enabling stable output to be achieved.

Moreover, in the electric motor 60 the gap length G is half the gap length in the electric motor 76 employing the dual Halbach array field system, and the amount of flux linkage interlinking with the coils 20 is also half. Thus although in the electric motor 60 the output torque for the same input current is half, the back electromotive force is half the back electromotive force in the electric motor 76 when the rotation speed is being raised while generating the same torque at the start of operation. However, due to being able to generate torque with the electric motor 60 up to a rotation speed twice that of the electric motor 76 for the same power source voltage, an output can be obtained that is similar to that of the electric motor 76.

In the electric motor 76, the outer rotor 80B is provided at the outside of the coils, and the outer rotor 80B is rotated. Thus a casing (case) is provided in the electric motor 86 at the outside of the rotor 80 (the outer rotor 80B).

In contrast thereto, in the electric motor 60 the rotatable rotor 62 is housed inside the outer cylinder section 68 of the stator 64. This thereby enables the outer cylinder section 68 forming the stator 64 to be employed as a casing in the electric motor 60, enabling a more compact configuration and a reduction in the number of components, and enabling a reduction in cost to be achieved. Moreover, a single Halbach array field system is employed in the electric motor 60, enabling the number of magnets 54 to be reduced in comparison to in the electric motor 76 employing the dual Halbach array field system, which accordingly enables an even greater reduction in cost to be achieved.

For electric motors of similar shape in radial direction cross-section and having the same axial direction length, the output (torque) increases in proportion to the third power of the ratio of similarity. This means that there is scope to make the radial direction dimension of the electric motor 60 larger, with the possibility to increase output of the electric motor 60 by making its radial direction dimension larger. Namely, the electric motor 60 can be expected to obtain a larger output/volume ratio than the electric motor 76.

Moreover, the back electromotive force is suppressed in the electric motor 60 due to employing the coils 20 that have air-cores. Thus even in cases in which inverter control is performed in the electric motor 60, heat generation by an inverter switching element can be suppressed from occurring, and high responsivity obtained. Moreover, in the electric motor 60 the outer cylinder section 68 is fixed, and so the outer cylinder section 68 can be cooled using cooling fins, cooling pipes, or the like, enabling the inside of the outer cylinder section 68 to also be cooled. The electric motor 60 is thereby able to more effectively suppress heat generation, enabling output of a large torque in a short period of time.

When such an electric motor 60 is employed in a vehicle so as to operate as the drive source in power mode and so as to operate as an energy recovery unit in braking mode, the magnetic energy that accumulates in the coils 20 can be made small even when the direction of current is reversed when switching from power mode to braking mode (recovery mode). The induced voltage at current switching can accordingly be made small, enabling the electric motor 60 to be suppressed from damaging a drive circuit employed to drive the electric motor 60. Moreover, the time to switch between power mode and recovery mode can also be shortened. This thereby enables good driving characteristics in terms of responsiveness to be provided in a vehicle.

Note that the electric motors (three-phase AC motors) 10, 60 have been described as examples of rotary electrical machines in the first exemplary embodiment and the second exemplary embodiment. However, an electromagnetic device thereof may be a rotary electrical machine such as a generator (three-phase generator) or the like, and the electromagnetic device may also be a three-phase linear synchronous motor, a linear generator, or the like.

The entire content of the disclosures of Japanese Patent Application Nos. 2017-165468 and 2017-219530 are incorporated by reference in the present specification.

All publications, patent applications and technical standards mentioned in the present specification are incorporated by reference in the present specification to the same extent as if each individual publication, patent application, or technical standard was specifically and individually indicated to be incorporated by reference.

The invention claimed is:

1. An electromagnetic device comprising:
    an armature provided with three-phase coils; and
    a field system including a plurality of permanent magnets arrayed in a prescribed direction such that their magnetization directions are changed in sequence, by steps of an angle computed by dividing one cycle's worth of electric angle of current in the coils by a number of divisions, the number of divisions being any integer greater than or equal to three,
    a rotor provided with the field system in which the plurality of permanent magnets are arrayed in a circumferential direction of the rotor; and
    a stator in which the rotor is disposed relatively rotatable at an interior or an exterior of a cylindrical shape formed from a magnetic material, and the three-phase coils being respectively provided along a circumferential direction on a rotor side peripheral face of the stator,
    wherein a stator side peripheral face of the field system is disposed at a position in which change in flux density of a magnetic flux between the field system of the rotor and the stator along a circumferential direction is a sinusoidal waveform.

2. The electromagnetic device of claim 1, wherein the coils are air-core coils.

3. The electromagnetic device of claim 1, the number of divisions is any number computed by adding two to a multiple of three.

4. The electromagnetic device of claim 3, wherein the coils have concentrated windings.

5. The electromagnetic device of claim 1, wherein a gap length G between the stator side peripheral face of the field system and the field system side peripheral face of the stator is smaller than a pole pitch $\tau$ of the field system.

6. The electromagnetic device of claim 1, wherein, in a fan shaped cross-section of the permanent magnets forming the field system, a mean value of a radial direction outside circular arc length and a radial direction inside circular arc length is smaller than a difference between a radial direction outside circular arc radius and a radial direction inside circular arc radius.

7. The electromagnetic device of claim 1, wherein the windings of the coils are made from Litz wire.

* * * * *